(12) United States Patent
Dekocker et al.

(10) Patent No.: US 12,515,893 B2
(45) Date of Patent: Jan. 6, 2026

(54) PRODUCT HANDLING APPARATUSES, SYSTEMS AND ASSOCIATED METHODS

(71) Applicant: Anheuser-Busch InBev S.A., Brussels (BE)

(72) Inventors: Wim Dekocker, Leuven (BE); Philippe Jean Marie Duperray, Châteauroux (FR); Glenn Ferreira, Leuven (BE); Tom Van Moer, Hamme (BE)

(73) Assignee: ANHEUSER-BUSCH INBEV S.A., Brussels (BE)

( * ) Notice: Subject to any disclaimer, the term of this patent is extended or adjusted under 35 U.S.C. 154(b) by 172 days.

(21) Appl. No.: 18/269,268

(22) PCT Filed: Dec. 21, 2021

(86) PCT No.: PCT/EP2021/087085
§ 371 (c)(1),
(2) Date: Jun. 22, 2023

(87) PCT Pub. No.: WO2022/136428
PCT Pub. Date: Jun. 30, 2022

(65) Prior Publication Data
US 2024/0059500 A1 Feb. 22, 2024

(30) Foreign Application Priority Data
Dec. 23, 2020 (BE) .................. 2020/5973

(51) Int. Cl.
*B65G 47/68* (2006.01)
*B65G 43/08* (2006.01)
(Continued)

(52) U.S. Cl.
CPC ............. *B65G 47/68* (2013.01); *B65G 43/08* (2013.01); *B65G 47/61* (2013.01); *B65G 47/918* (2013.01);
(Continued)

(58) Field of Classification Search
CPC ........ B65G 47/61; B65G 47/68; B65G 43/08; B65G 2201/0244; B65G 47/918; B65G 47/082
(Continued)

(56) References Cited

U.S. PATENT DOCUMENTS 3,455,434 A * 7/1969 Lorken ................... B65B 57/14
198/430
5,443,357 A * 8/1995 Leeds .................... B65G 61/00
414/792.9
(Continued)

FOREIGN PATENT DOCUMENTS

DE 102010018153 A1 10/2011
DE 102011016855 A1 10/2012
(Continued)

OTHER PUBLICATIONS

International Search Report and Written Opinion for PCTEP2021087085 mailed dated Mar. 17, 2022, 15 pages.

*Primary Examiner* — James R Bidwell
(74) *Attorney, Agent, or Firm* — ArentFox Schiff LLP

(57) ABSTRACT

A product handling apparatus, systems and associated methods. A product handling apparatus, includes a continuous circuit having an infeed length; and a discharge length. A carriage configured to travel around the circuit between the infeed length and the discharge length has a first picking tool configured to selectively engage a first product; and a second picking tool configured to selectively engage a second product. The product handling apparatus is configured to pick a first and second product arranged in a first arrangement at the infeed length and place the first and second product in a second arrangement, different to the first arrangement, at the discharge length.

15 Claims, 13 Drawing Sheets

(51) Int. Cl.
*B65G 47/08* (2006.01)
*B65G 47/61* (2006.01)
*B65G 47/91* (2006.01)

(52) U.S. Cl.
CPC .... *B65G 47/082* (2013.01); *B65G 2201/0244* (2013.01)

(58) Field of Classification Search
USPC ............................................. 198/418.6, 430
See application file for complete search history.

(56) References Cited

U.S. PATENT DOCUMENTS

| | | | | |
|---|---|---|---|---|
| 6,805,230 | B2 * | 10/2004 | Correggi | B65G 47/088 53/448 |
| 6,868,652 | B2 | 3/2005 | Arends et al. | |
| 8,903,540 | B2 | 12/2014 | Stork et al. | |
| 9,546,049 | B2 | 1/2017 | Lindauer | |
| 9,604,792 | B2 | 3/2017 | Wipf | |
| 10,150,219 | B2 | 12/2018 | Ridel et al. | |
| 12,291,408 | B2 * | 5/2025 | Carboni | B65G 47/918 |

| | | | |
|---|---|---|---|
| 2019/0255698 | A1 | 8/2019 | Zeiner et al. |
| 2020/0079596 | A1 | 3/2020 | Frank et al. |
| 2021/0229847 | A1 | 7/2021 | Kalany et al. |

FOREIGN PATENT DOCUMENTS

| | | | | |
|---|---|---|---|---|
| DE | 102011083377 | A1 | | 3/2013 |
| DE | 202013105022 | U1 | | 2/2014 |
| DE | 102013111088 | A1 | | 4/2015 |
| DE | 102016211169 | A1 | | 12/2017 |
| DE | 202018103487 | U1 | | 8/2018 |
| DE | 102019115198 | A1 | | 12/2020 |
| EP | 1803665 | B1 | | 5/2009 |
| EP | 1530541 | B1 | | 7/2009 |
| EP | 2338795 | B1 | | 10/2012 |
| EP | 3105017 | A1 | | 12/2016 |
| EP | 3317186 | B1 | | 7/2019 |
| EP | 3577046 | A1 | | 12/2019 |
| EP | 3604182 | A1 | | 2/2020 |
| EP | 3405395 | B1 | | 7/2020 |
| EP | 3699099 | A1 * | 8/2020 | ............ B65B 11/00 |
| EP | 3181495 | B1 | | 11/2020 |
| EP | 3778439 | A1 | | 2/2021 |
| WO | WO2015121668 | A1 | | 8/2015 |
| WO | WO2018144552 | A1 | | 8/2018 |

* cited by examiner

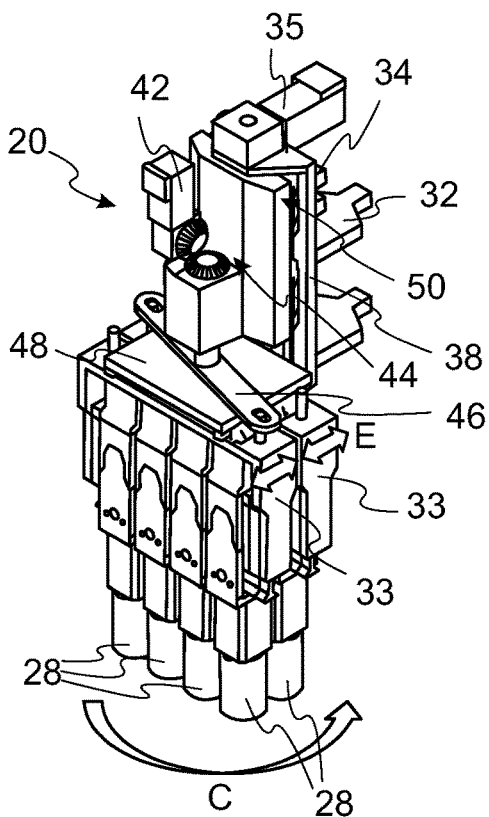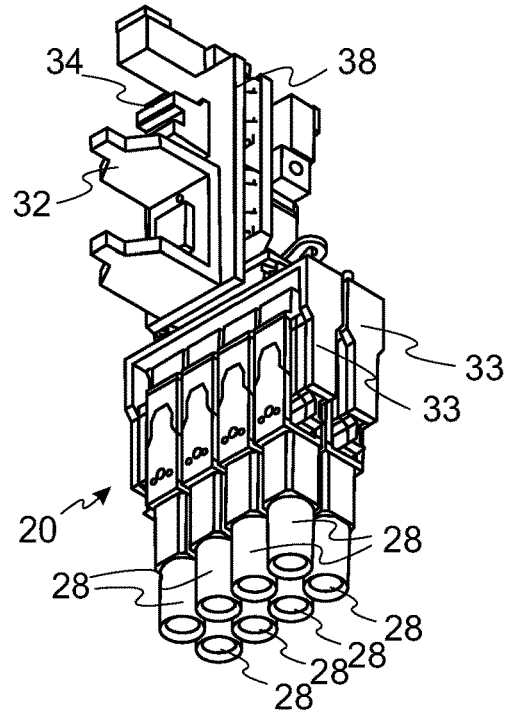
FIG. 3A                FIG. 3B
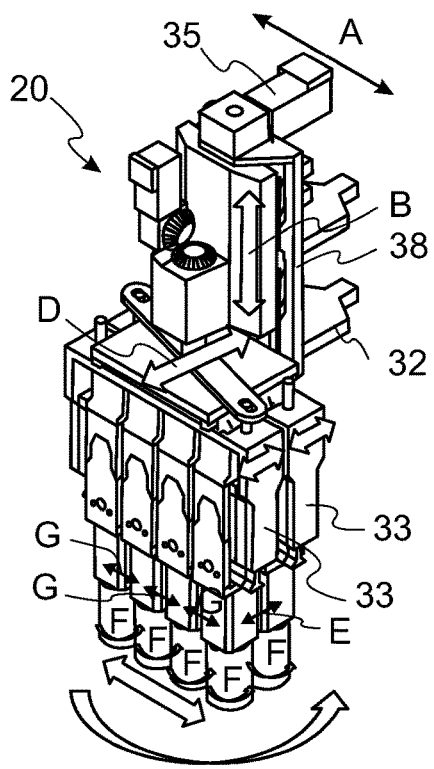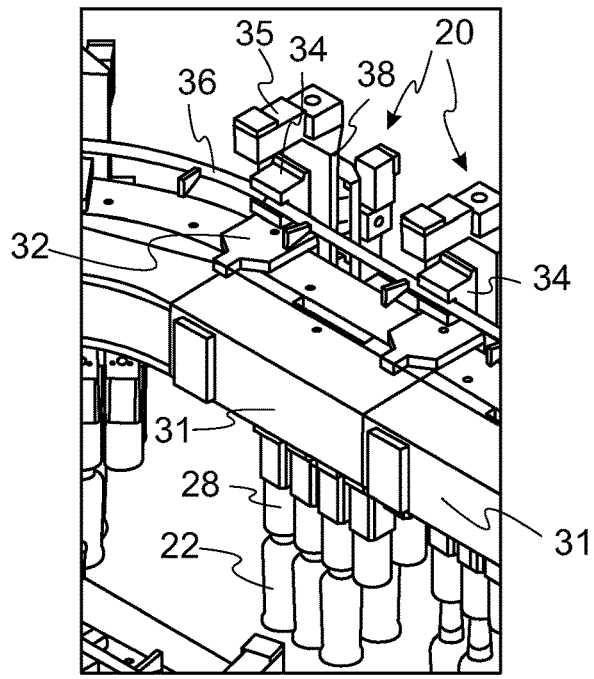
FIG. 3C                FIG. 3D

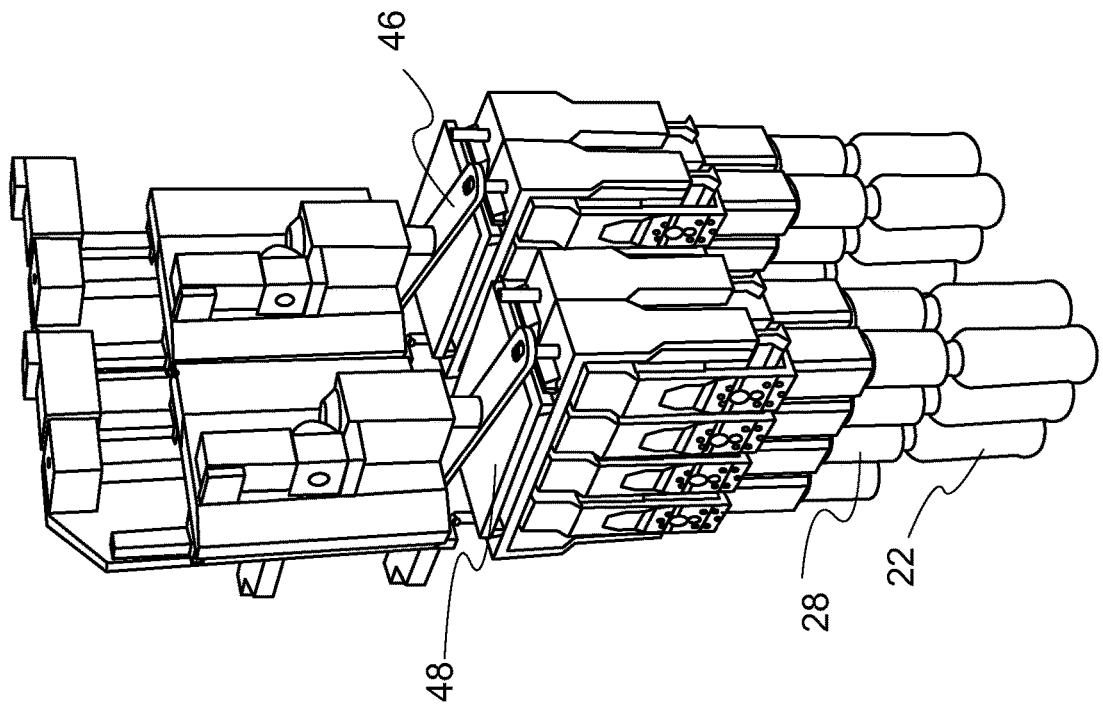
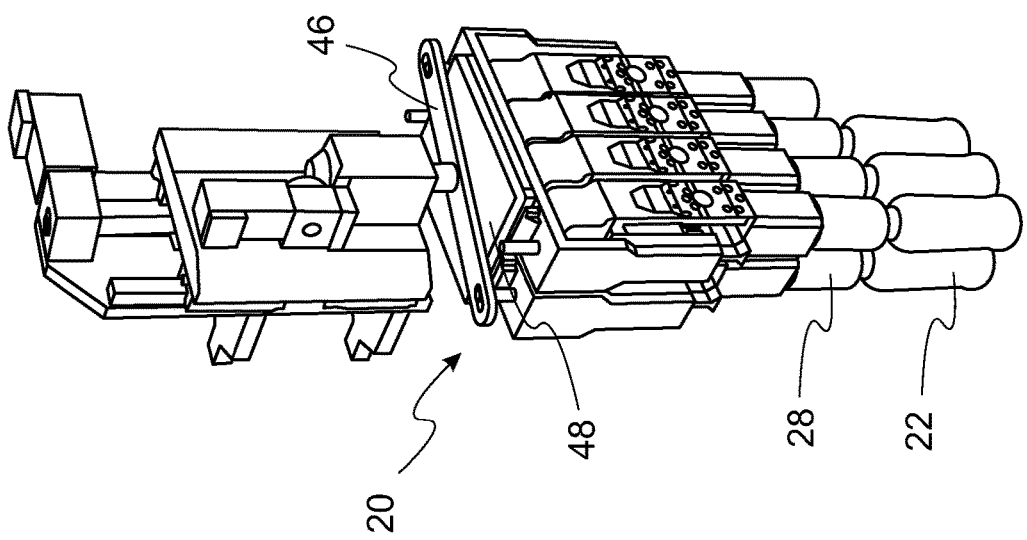

| | pick | transfer | place |
|---|---|---|---|
| 1x3 | | | |
| 1x4 | | | |
| 1x5 | | | |
| 2x2 | | | |
| 2x3 | | | |
| 2x4 | | | |
| 2x5 | | | |
| 3x3 | | | |
| 3x4 | | | |
| 3x5 | | | |
| 3x6 | | | |
| 4x4 | | | |
| 4x5 | | | |
| 4x6 | | | |

FIG. 16

PRODUCT HANDLING APPARATUSES, SYSTEMS AND ASSOCIATED METHODS

FIELD

The disclosure relates to product handling equipment, in particular automated handling equipment.

BACKGROUND

Product handling requirements are numerous and increasingly varied. As the extent of automation increases there is a growing range of product handling requirements that must be met by handling systems.

The majority of consumer goods, including beverages, will go through a number of automated product handling processes to, prepare, check, convey, collate, group and package the products. Different products will typically not only have different primary packaging geometries (e.g. round vs shaped cross section), and be packaged in different type, sizes, shapes, mass and materials (e.g. glass, aluminium, plastic composites) but will also have different packaging requirements in terms of the number, formation, orientation and pitch (i.e. spacing) of the products. Additionally, different packaging apparatuses have different infeed requirements—for example transportation unit geometry, speed, laning, collation and line pressure relief.

Different product handling operations will often be undertaken by different product handling apparatuses. Product handling operations will therefore typically use a range of different product handling apparatuses. Different apparatuses and systems involved in the preparation, checking and packaging of products will handle and batch the products in different ways. Therefore, the arrangement of products output or discharged from different apparatuses varies greatly. Arrangements may vary in terms of the number of rows of product, the pitch (spacing) of products, relative location of products and the orientation of individual products. Some systems may discharge a single row of products at a regular spacing, while others may discharge a random arrangement of products. Similarly, some systems discharge products in a spaced arrangement, while others may discharge sequential products under line pressure. Limitations can be put on product handling systems due to the infeed/discharge compatibility of sequential product handling apparatuses.

In addition to apparatus compatibility considerations, secondary packaging for products for sale will typically be arranged in a specific arrangement having a set formation with a standardised orientation. Furthermore, a specific pitch of the products will also be required, for example to minimise the volume of the secondary packed product. The arrangement for secondary packaging and sale will rarely align with the native discharge of product preparation apparatuses. A specific product handling apparatus is therefore often employed to arrange products for packaging.

Using a single product handling system, suitable for processing multiple types of product can minimise the costs, logistics, manpower and space requirements of having multiple different handling systems. In some cases single handling systems and apparatuses are usable with different products, however, given the varying geometries and requirements of different types of products and secondary packaging, extended periods of changeover are typically required to adapt the systems and apparatuses for use with the new product type—for example to exchange what are often referred to as change parts. A major factor in the cost of product handling operations is the amount of downtime and off optimum production time—that is, the length of time that the product handling system is either not operational or operating in ramp up before full capacity is realised—and the downtime resulting from having to replace change parts and execute machine adjustments and fine tuning upon changeover, greatly reduces the efficiency and increases costs of handling operations.

As the range and flexibility of product handling systems and apparatuses increases, the complexity of monitoring and controlling handling operations increases. Providing power and control connections to the wide range of moving parts can be a logistical challenge, and can result in challenges both in terms of data management as well as physical interference. The frequency and impact of errors increase as the complexity of product handling increases. Systems with fixed handling routines that are incapable of monitoring and adapting operations to system statuses are likely to suffer from increased downtime.

SUMMARY

According to the present disclosure is a product handling apparatus, systems and associated methods.

Examples according to the disclosure provide greatly increased flexibility. Specifically, the ability to use a single apparatus, system or method with multiple different products, received in a random arrangement with random orientations, and to output a wide range of different arrangements to align with secondary packaging requirements. Accordingly, examples described below are compatible with a wide range of infeed/discharge requirements.

This is achieved without the need for significant downtime in order to exchange parts or manually reconfigure equipment. Examples of the disclosure are capable of automatically adjusting arrangements in order to accommodate new primary products (type, size, shape, mass) and package into any of an extended array of packaging formats. Such changeovers between primary products and packaging formats can be completed on the fly with minimal, or no, downtime. In fact, many adjustments and rearrangements can be completed during use and hence reconfigurations happen on-the-fly.

Examples according to the disclosure also allow dynamic rearrangement of products. As such, products can be rearranged between an infeed and discharge location. This allows products to be discharge in arrangements suitable for secondary packaging. In fact, products can be placed directly into or onto secondary packaging at the discharge, without having to be transferred to other modules or equipment to perform those functions, all of which would take up additional space and incur operational inefficiencies.

The apparatuses, systems and methods disclosed herein provide a compact, programmable, high capacity, highly flexible, multi-functional, primary product handling system which is robust and digitally suitable for handling a wide range of primary product containers (type, size (diameter, height), shape, material, rigidity, flexibility, mass) into an exceptionally wide range of both aligned (rows & columns) and combination aligned and/or nested packaging formats/patterns, and doing so automatically without change parts nor manual adjustments, via a control system enabling synchronization of independent motion controlled apparatuses.

According to a first aspect of the disclosure is a product handling apparatus. The product handling apparatus may comprise a continuous circuit. The continuous circuit may comprise an infeed length and a discharge length. The product handling apparatus may comprise a carriage configured to travel around the circuit between the infeed length and the discharge length. The carriage may comprise a first picking tool configured to selectively engage a first product and a second picking tool configured to selectively engage a second product. The product handling apparatus may be configured to pick a first and second product arranged in a first arrangement at the infeed length and place the first and second product in a second arrangement, different to the first arrangement, at the discharge length.

Throughout the present disclosure directions and orientations may be described with reference to vertical and horizontal. These terms are to be given their normal meaning. Terms such as horizontally, horizontal, vertically or vertical may refer to the arrangement of the examples when in or during use.

An orthogonal x-y-z coordinate frame may be defined to assist with such references. The z-axis may be arranged in a vertical direction opposite to the direction of gravity. An x-y plane may be in a horizontal plane. The x-axis may be parallel to the infeed length of the circuit. The x-axis may be aligned with a product infeed direction, otherwise known as machine direction. The y-axis may be horizontally across machine direction.

The product handling apparatus may be a continuous product handling apparatus. The product handling apparatus may be configured to pick and place products on continuously moving transportation units. The carriage may be configured to move around the circuit with continuous motion, following a motion profile of various speeds, accelerations and decelerations. Continuous may refer to the uninterrupted feeding of products to the product handling apparatus, around the product handling apparatus and away from the product handling apparatus.

The continuous circuit may define a pathway, along which the carriage may move. The circuit may be a track (e.g. a rail).

The circuit may be substantially any shape, provided the machine configuration is such that momentarily the path of the tooling at the infeed runs parallel with the path of the product supply and such that momentarily the path of the tooling at the discharge runs parallel with the path of the packaging transportation system. Example shapes include substantially oval, obround, square or rectangular circuits with radius corners or round. The circuit may be configured to accommodate the arrangement of apparatus within the workspace.

The continuous circuit may be, or comprise, a closed loop track. The carriage may be arranged on the track. The carriage may be attached to the track such that it can freely move around the track, but cannot immediately leave the track without intervention.

The track may be a rail.

The track and carriage together may form an independent mover apparatus, such as a linear motor. The track and carriage may provide independent motion-controlled travel of the carriage around the track. The track may comprise, as an example, statically mounted linear stators, for example embedded within the track. In the case of linear drives, the carriage may comprise magnets arranged to face the track during use. The interaction between the linear stators and magnets may act to drive the carriage around the track. The magnets within the carriage may be arranged to stay in close proximity to the stators within the track during movement of the carriage around the track. Other carriage propulsion mechanisms may be used.

The power for the linear motor may be provided via a wired connection.

The continuous circuit may be arranged in a plane. The continuous circuit may be arranged in a horizontal plane. The majority of the continuous circuit may be arranged in a horizontal plane.

The track may be configured to be adjustable in a vertical direction. The track, along with any carriages located thereon, may be raised and lowered. This may allow a product handling apparatus to handle a range of products of various heights.

In other examples the carriages may be levitating tiles, surface roaming automated guided vehicles or flying drones.

The infeed and discharge lengths may be straight or curved.

An infeed transportation unit may be arranged at the infeed length. The infeed length may correspond to an infeed transportation unit. A discharge transportation unit may be arranged at the discharge length. The discharge length may correspond to a discharge transportation unit. The infeed and discharge length may be aligned with, opposite and below, or arranged above the corresponding product and packaging transportation systems, respectively.

The machine configuration may be such that momentarily the path of the tooling at the infeed length runs parallel with the path of the product supply and such that momentarily the path of the tooling at the discharge length runs parallel with the path of the discharge transportation unit. The circuit having lengths corresponding to an infeed and discharge may allow a carriage to match an infeed and/or discharge speed as it moves around the circuit. This may allow a single movement actuator to facilitate movement of the carriage between the infeed and discharge transportation units and speed matching to the infeed and discharge transportation systems to allow continuous operation. This may avoid the need for separate, compound actuators, one for each movement requirement.

The first and second picking tools may be configured to engage the first and second products, for example simultaneously.

The carriage may comprise a plurality of picking tools (including the first and second picking tools). The picking tools may be provided in at least one row.

Non limiting examples of the number of picking tools may include four, six, eight and ten picking tools. The picking tools may be provided, or arrangeable, in a pattern—for example a grid formation with orthogonal rows and columns of picking tools, or a nested arrangement with offset rows of picking tools. The pattern may be selected to match the product arrangement to be picked.

A row of picking tools may extend parallel to the circuit at the point of the circuit on which the carriage is located, e.g. in the direction of travel of the carriage around the circuit. A column of picking tools may extend perpendicular to the circuit at the point of the circuit on which the carriage is located, e.g. perpendicular to the direction of travel of the carriage around the circuit. Corresponding rows and columns of products may be provided on the infeed and discharge transportation units.

Products may be provided at the infeed transportation unit and received by the product handling apparatus in groups with orthogonal rows and columns. The carriage may comprise correspondingly arranged picking tools to engage the products. Example patterns of products that may be received at the infeed length include: one row by any of two to eight columns, or two rows by any of two to eight columns of picking tools.

Products may be discharged at the discharge transportation unit in groups with orthogonal rows and columns. Example patterns of products discharged by the product handling apparatus include any of one to four rows by one to eight columns. At the discharge length, products groups of products may be provided in a nested pattern, with offset rows or columns of products.

Groups of product with three or four rows may be assembled via multiple carriage drops of 90° rotated primary products arrangements onto the packaging discharge transportation unit. In the case of odd numbered columns of the three or four row discharge configurations, some carriage drops may be split between two consecutive package configurations on the discharge transportation unit. As can be seen, the product handling apparatus of the present disclosure may allow different rows and/or columns at the discharge length compared to the infeed length. This will be discussed in more detail below.

Where a plurality of picking tools is described, all of the individual picking tools may be similar, or identical. As such, description provided herein relating to a single picking tool applies equally to each picking tool.

The picking tools of the present disclosure may be selectively rearranged. The carriage may be configured to reconfigure or rearrange the picking tools, for example during use (i.e. "on the fly"). The picking tools may be rearranged during use of the product handling apparatus (and during use of the picking tools themselves). That is, the picking tools may be rearranged as the carriage travels around the circuit. The carriage may be configured to rearrange the first and second picking tools in response to receiving control instructions or actuation signals. The picking tools may be rearranged in an automated manner (i.e. without the need for a user to directly adjust the product handling apparatus).

The picking tools may be rearranged prior to engaging products. The carriage may be configured to pick products of a first type or arrangement at the infeed length during a first operational window, and then rearrange the picking tools to pick products of a second type or rearrangement at the infeed length during a second operational window. The second operation window may follow a process for completing operation with a first product type and initiating picking with a second product type.

The first and second picking tools may be rearrangeable for picking products in a plurality of different arrangements at the infeed length. The picking tools may be reconfigurable between, or configured to move between, having a first arrangement at the infeed length and a third arrangement at the infeed length—for example to pick products arranged in either, or both, of a first arrangement or third arrangement at the infeed length.

The carriage may be configured to rearrange the products. When engaging, picking, supporting or placing products, the arrangement of the first and second products corresponds to that of the first and second picking tools. As such, it is understood that changes in arrangement of the products are facilitated by changes in arrangement of the picking tools.

The carriage may be configured to arrange the first and second picking tools in the first arrangement at the infeed length and move the first and second picking tools to the second arrangement as the carriage moves to the discharge length.

Each of the first and second (and further) arrangements may be defined by one, any or all of:
- a position of the second product (or second picking tool) relative to the first product (or first picking tool);
- a position of the first and second product (or first and second picking tools) perpendicular to the circuit;
- a pitch of the first and second products (or first and second picking tools); and
- an orientation of each of the first and second products (or first and second picking tools);

wherein at least one of the above relative position, perpendicular position, pitch and an orientation of the second arrangement is different to that of the first arrangement.

A change in arrangement may comprise a change in one, some, or all of the positions, pitch and orientation of the picking tools.

The position of the second picking tool relative to the first picking tool may depend on the location of the second picking tool relative to the first picking tool in a plane—for example a horizontal plane.

The carriage may be configured to rotate the first and second picking tools about a common vertical axis for changing the relative position of the first and second picking tools or products supported therein.

The carriage may be configured to rotate the first and second picking tools by any angle.

Where an arrangement of products or picking tools comprises a number of rows and columns, wholesale rotation of the products or picking tools by 90 degree may switch the rows and columns of the arrangement. For example, a 2×4 formation may be, rotated by 90 degrees to form a 4×2 formation. This provides increased flexibility in terms of infeed and discharge matching, as a wide range of discharge formats can be serviced by a range of infeed formats aligned with the supply direction of the infeed transportation unit.

The position of the first and second picking tool perpendicular to the circuit may refer to the distance between the first and second picking tools from the circuit in a horizontal plane. The position of the first and second product perpendicular to the circuit may refer to the positions of the picking tool relative to a machine datum at the infeed and/or discharge length.

The carriage may be configured to translate the first and/or second picking tools perpendicular and/or parallel to a direction of movement of the carriage or the circuit at the point on which the carriage is located.

The first and second picking tools may be moveable in a horizontal direction towards or away from the circuit. This allows the product handling apparatus to align picking tools and products with a plurality of different machine datums, for example at the infeed or discharge, without needing significant downtime to manually reconfigure the apparatus. The product handling apparatus may be configured to pick products from an infeed transportation unit having a first machine datum relative to the circuit (eg. aligning the first and second picking tools with the centerlines of the one or more infeed transportation units), and place the products on an output transportation unit having a second machine datum relative to the circuit; the product handling apparatus may be configured to then pick products from a second infeed transportation unit having a third machine datum The adjustments required to respect multiple machine datums can be done on-the-fly without requiring significant downtime for manual intervention.

The first and second picking tools may be moveable relative to the rest of the carriage in a direction parallel to the point of the circuit at which the carriage is located. The carriage may be configured to translate a row of picking tools relative to an adjacent row of picking tools in a direction of movement of the carriage.

The pitch of the first and second picking tool may refer to the spacing between the first and second picking tool, for example the centre-to-centre spacing of the first and second picking tools/products relative to each other. This naturally also corresponds to the pitch of any products picked/placed by the picking tools.

The first and second picking tools may be configured to move towards or away from each other for changing the pitch of the first and second picking tools (or products supported therein). This relative movement may be in a direction parallel and/or perpendicular to the circuit at the point on which the carriage is located. This may allow primary containers to be brought close together in an aligned or nested fashion (i.e. single container contact or double container contact between rows of containers).

The orientation of the first and/or second picking tool/product may define the direction that the picking tool (or product) is facing. The orientation may be the absolute rotational arrangement of the picking tool (or product) about its longitudinal axis through its centre (e.g. a vertical axis).

A, or each, picking tool may be configured to rotate a product supported in the respective picking tool about its vertical axis for changing the orientation of the product. This may be achieved by rotating the picking tool, or rotating a product within the picking tool.

The carriage may be configured to rearrange the picking tools and/or products to place products in an orthogonal rows and columns arrangement or a nested arrangement with offset rows and/or columns, e.g. wherein a product may, at a minimum, be in contact with two adjacent product containers.

Arrangements of products and/or picking tools may be moved between orthogonal and nested arrangements by a combination of the above-described rearrangements. For example, orthogonal rows may be rearranged to a nested arrangement by translating a row of picking tools (and products) relative to an adjacent row of picking tools in a direction of movement of the carriage and then moving the row of picking tools perpendicular to the circuit to reduce the spacing of the two rows.

The carriage may also be configured to move the picking tools vertically. This vertical movement may be collectively or independently, relative to the circuit. Moving the picking tools vertically relative to the circuit may facilitate smooth picking and placing of products.

The picking tools may also be configured to move vertically due to vertical movement of the circuit relative to the infeed/discharge transportation units.

Adjusting the product handling apparatus such that products of different heights can be accommodated may be achieved by adjusting the height of the circuit (and carriages arranged thereon).

As the primary product containers are supported and transported upon their bases, this allows the product handling apparatus to handle a range of products heights.

Naturally, where the column-wise pitching/spacing at the discharge length differs from that at the infeed length the relative infeed and discharge speeds (e.g. the speeds of infeed and/or discharge transportation unit) must be adapted and the pitch and pace of the picking carriages synchronized accordingly to ensure continuous picking, formatting, picking head orienting and dropping operations.

The product handling apparatus is able to receive a wide range of different products and product arrangements at the infeed length and handle these goods without significant downtime and without the need for extensive change parts. By providing a product handling apparatus capable of being in a plurality of different configurations at the infeed length, the same product handling apparatus is able to handle a first set of products that have a first diameter and centre-to-centre spacing, and then reconfigure the picking tools to handle a second set of products, which have a second diameter and centre-to-centre spacing. By rearranging the picking tools dynamically rather than requiring replacement parts, the amount of downtime is reduced, if not eliminated.

The first and second picking tools may comprise an engagement portion, configured to engage and grip a product. The first and second picking tools may be configured to engage a range of different products.

The picking tools of the present disclosure may be configured to selectively and independently engage and disengage a product. This may allow a single carriage to undertaken multiple product placements—for example as parts of separate output groups or arrangements. A first picking tool may place a product as part of a first product group and a second picking tool may place a product as part of a second product group.

The engagement portion may be a mechanical or pneumatic gripper, suction cup, tulip or any other electro-mechanical device to temporarily and selectively attach the primary product container. In some examples, the engagement portion may comprise a range of different engaging surfaces, each of which is configured to grip a different product. The products may be held by the first and second picking tools using a mechanical, pneumatic action.

The first and second picking tools may be configured to engage and support products with a range of shapes, or constant or varying cross section, for example cylindrical, cuboidal and ovoid. The picking tools may be configured to engage and support any, multiple or all of the following products: bottles, cans, cartons, boxes, jars, tubes, cups, sachets. Example dimensions for bottles that may be engaged and supported by the picking tools include those with a diameter of 56.3 to 85.0 mm and a height of 183 to 299 mm. The picking tools may be configured to engage and support short and long neck bottles. Example dimensions for cans that may be engaged and supported by the picking tools include those with a diameter of 53 to 66.5 mm and a height of 106 to 194 mm. The picking tools may be configured to engage and support cans with any of a 200 (50 mm), 202 (52 mm) and 206 (57 mm) lid.

The product handling apparatus may comprise a plurality of carriages. Each carriage may comprise a plurality of picking tools, configured to pick products at an infeed length and place products at a discharge length.

The carriage may be a first carriage, the product handling apparatus may further comprise a second carriage configured to travel around the circuit between the infeed length and the discharge length. The second carriage may comprise a first picking tool configured to selectively engage a product; and a second picking tool configured to selectively engage a product.

The product handling apparatus may comprise one or more, or any number of carriages.

The number of carriages may depend on the specific size, capacity, motion profiles, range of primary containers, range of secondary packaging formats and operational requirements of the handling operations.

The second carriage may be configured to travel around the circuit independently to the first carriage, for example such that the product handling apparatus may be configured to vary a spacing between the first carriage and second carriage.

The second (and any subsequent carriages) may be similar, or identical, to the first carriage. As such, any description relating to a single carriage applies, mutatis mutandis, to every carriage of the product handling apparatus.

Each carriage may be independently controlled to the other carriages. That is, the movement of each carriage may be independent to that of the other carriages. This providing for a flexible system of independent motion-controlled mover mounted carriages with powered and controlled container picking, formatting, positioning, pitching, collating, orienting, head rotating and lifting/lowering, off-setting movements articulated thereon.

The first carriage may be configured to pick a first and second product at the infeed length. The second carriage may be configured to pick a third and fourth product at the infeed length. The first and second carriages may be configured to place the first, second, third and fourth product in a single arrangement at the discharge length.

The product handling apparatus may be configured to vary the speeds of the first and/or second carriages around the circuit such that the spacing between the first and second carriages is minimised as the carriages approach, or are at, the discharge length. This may allow products from multiple carriages to be placed as part of the same group of products (and hence arrangement) at the discharge length.

The product handling apparatus may be configured to provide a single arrangement of products at the discharge length from products placed from a plurality of carriages. A picked arrangement of primary products (e.g. picked format) may be rotated and used to assemble larger arrangements (e.g. discharge format packs) than the picked arrangement via multiple drop actions by the carriage(s) at the discharge length of the track as part of a process of constructing the said larger pack formats.

Depending on the required discharge arrangement, the first and/or second carriages may rotate the picking tools in addition to dropping multiple infeed groups of products in a single discharge group. For example, a first and second carriage may each pick a group of products with an arrangement with two rows and four columns at the infeed length. The first and second carriages may rotate their respective picking tools during transit to provide an arrangement with four rows and two columns. The first and second carriages may place their respective products at the discharge length in a single group, e.g. as a single arrangement. This single group of products on the discharge transportation unit may have an arrangement with four rows and four columns. If a third carriage also places their products as part of the same group of products, the discharge group of products will have an arrangement with four rows and six columns.

Should a 4×5 formation be required at the discharge length, the third carriage may place one (1×4) column of product at the end of a first group of products and a second (1×4) column at the start of a following group of products to be assembled.

The product handling apparatus may comprise a plurality of sensors. One or more of the sensors may be used to provide real-time picking tooling status and operational information. The same and/or other sensors may be used to provide non-real-time predictive maintenance and condition and performance monitoring data. The product handling apparatus may comprise sensors configured to determine the location and speed of the carriage, the presence of a product in the picking tools, the arrangement of the picking tools, the speed of the infeed/discharge transportation unit and the presence and arrangement of products on the infeed/discharge transportation unit.

The product handling apparatus may be configured to use data from the sensors to generate control instructions for controlling operation of the product handling apparatus.

The product handling apparatus may comprise a control module, or plurality of control modules, configured to operate one, some or all of the infeed transportation unit, discharge transportation unit, circuit, carriage and/or the picking tools. The control module(s) may be configured to generate and/or execute control instructions for operating the product handling apparatus. The product handling apparatus may further comprise a communication device or devices, which may be operably connected to the control module(s). The communication device(s) may be configured to communicate sensor data, actuation signals and/or control instructions. The communication devices may be wired (e.g. using cables), or wireless.

The carriage may be configured to wirelessly communicate with the rest of the product handling apparatus and wider system. The carriage may comprise a wired or wireless communication device, for example configured to receive sensor data, actuation signals or control instructions, or to transmit sensor data, actuation signals or control instructions. The carriage may comprise a control module for generating and/or executing control instructions configured to operate the carriage and picking tools. The carriage may be configured to receive actuation signals to operate the carriage and picking tools.

The power requirements of the carriage (e.g. for the sensors, actuators, communication devices, controller etc) may be met wirelessly. The carriage may be inductively powered.

The circuit may comprise a first inductive power transmitter, the carriage may comprise an inductive power receiver. The product handling apparatus may be configured such that the carriage is inductively powered during use.

The carriage may be configured to receive all of its power contactlessly and data wirelessly. The inductive power supply may be used to charge an on board rechargeable energy storage device. This in turn may be used to provide substantially stable and continuous power to the mover mounted power consumers—e.g. actuators and control equipment.

The carriage may be untethered from the rest of the product handling apparatus. The carriage may be absent of any permanent fixed attachments (e.g. control system wires, power, sensor and actuation device cables, pneumatic/vacuum tubes or any utility media hose connections) between itself and the circuit.

The product handling apparatus may be automated. The carriage may be remotely controlled. The operation of the carriage may be controlled by control instructions or actuation signals—for example received from a remote management module.

The various components of the product handling apparatus may comprise a plurality of actuators to actuate the movements and rearrangements described herein. The plurality of actuators may be configured to operate in response to the control instructions being executed, for example by a processor. Alternatively, the actuators may actuate responsive to the receipt of actuation signals, which may be received using wired or wireless means.

According to a further aspect of the disclosure is a product handling system comprising a product handling apparatus as described anywhere herein.

The product handling system may further comprise an infeed transportation unit for feeding products to the product handling apparatus at the infeed length. The product handling system may comprise a discharge transportation unit at the discharge length, for transferring products away from the discharge length of the product handling apparatus. The infeed length of the circuit may correspond to, or be aligned with, the infeed transportation unit. The discharge length of the circuit may correspond to, or be aligned with, the discharge transportation unit.

The product handling system may be configured to operate with the infeed and discharge transportation units moving continuously (e.g. while in transit).

The product handling system may be a continuous product handling system. That is, products may continuously be fed to the apparatus by the infeed transportation unit and taken away from the apparatus by the discharge transportation unit with continuous motion. Depending on the size, capacity and operational requirements of the system, there may or may not be any pause in movement of the products during normal operation of the system (e.g. with each carriage being independently motion-controlled and thus of variable pitch and pace about the circuit, the carriage may slow down or even stop momentarily at one or more lengths or locations, respectively, about the circuit).

The carriage may be configured to synchronise its speed with that of the infeed transportation unit when picking the first and second products at the infeed length. The carriage may be configured to synchronise its speed with that of the discharge transportation unit when placing the first and second products at the discharge length. These speeds may be different. The carriage may be configured to dynamically pick and place the first and second products.

Although the infeed transportation unit and output transportation unit are configured to operate continuously about the motion profile applicable for the active packaging operation, The infeed and discharge speeds must be matched to the specific requirements of the handling operations. The relative infeed and discharge speeds will be determined by machine capabilities, as well infeed and discharge formats. (i.e. the infeed, formatting and discharge capacities must be balanced, are modulated and are maximum throughput limited by the constraint of the lowest capacity function. There is no buffering of product within the machine, as there is just series flow of first in, first out.) For example, if the discharge product arrangements have twice as many rows as the infeed arrangements, the discharge speed will be half that of the infeed speed (all else being equal).

The infeed transportation unit may comprise a belt for conveying the base supported products into the product handling apparatus.

The infeed transportation unit may comprise a pre-linearisation device to arrange the products into rows prior to reaching the product handling apparatus.

The infeed transportation unit may comprise a pre-pitching device configured to arrange infeed products for engagement with the first and second picking tools. The pre-pitching device may be configured to arrange the products into groups of products on the infeed transportation unit. The pre-pitching device may be configured to separate adjacent groups to remove the line pressure from the continuous row of products.

The pre-pitching device may comprise a track. The track may comprise independent motion controlled movers. A plurality of mover mounted separators, fittings or container handling devices, may be arranged to move around the track in an independent, pitch and pace variable manner, to engage products on the infeed transportation unit for separating the continuous rows of products into groups or arrangements, to hold back supply line pressure and release the said groups or arrangements of product to the main picking, formatting and placing apparatus in a regular, uniformly pitched, aligned and controlled group pitch manner.

Should the container engagements be via powered and controlled mover mounted devices, those devices may be contactlessly, inductive powered directly or via an on-board energy storage cell and wirelessly controlled directly from a central controller or via an on-board controller responding to signals from the central controller. Should inductively powered and wirelessly controlled container handling devices be used at the pre-pitching apparatus, the same power and bi-directional control systems may be used to power mover mounted sensors and provide status and condition feedback information into the remote controller.

The provision of the pre-pitching apparatus may allow the product handling system to receive a randomly pitched and oriented arrangement of products.

Being a plurality of independent mover mounted toolings, the pre-pitching apparatus may be automatically adjusted for variation in container diameter and/or size and/or shape and may be remotely configured to group, for example, between 2 and 8 containers in a row, per group and for release in variable pitch and/or pace to match capacity and operational requirements (e.g. minimum pitch of the carriers) of the main container handling apparatus.

An infeed line control and grouping apparatus is applied to each lane of primary containers entering the machine. Each infeed grouping apparatus may deliver one or more rows or pre-arranged patterns of grouped product to the product handling apparatus suitable for the carriage mounted picking tools to engage.

An optical scanning system may be located downstream (after) the pre-pitching function, immediately before the infeed length. The optical scanning device may be configured to scan a product on the infeed transportation unit. The optical scanning device may be configured to determine the location and/or orientation of a product on the infeed transportation unit. The optical scanning device may be configured to transmit data relating to the location and/or orientation of products on the infeed transportation unit to a management module where synchronized response and controlled operation of the product handling apparatus is managed.

The product handling system may be automated. The infeed transportation unit and the pre-pitching apparatus may be remotely controlled. That is, the operation of the infeed transportation unit and the pre-pitching apparatus may be controlled by a remote controller.

The infeed transportation and pre-pitching apparatus may comprise a plurality of sensors configured to sense characteristics of the infeed transportation unit's operation. The plurality of sensors may be configured to monitor the pre-linearisation and pre-pitching of the products being fed into the product picking apparatus.

In other examples, the infeed system may comprise one or more communication devices. The above comments apply equally to wired or wireless communication systems.

The discharge transportation unit may comprise packaging arranged to receive the products. The product handling apparatus may be configured to place the first and second products into or into the packaging.

The product handling system may comprise a packaging management apparatus. The discharge of the product handling system may be a plurality of products arranged in or on secondary packaging in preparation for the next process step.

The product handling system may be configured to locate packaging on the discharge transportation unit and assemble the packaging, if required, around the products once the products have been placed on or in the packaging by the product handling apparatus.

The discharge transportation unit may comprise a communication device for communicating with the rest of the product handling system, for example by communicating sensor data, operational parameters, control instructions or actuation signals. The discharge transportation unit may comprise a control module for generating and/or executing control instructions or actuation signals.

The product handling system may further comprise a management module configured to control the product handling apparatus, the infeed transportation unit and/or the discharge transportation unit. The management module may comprise: a communication device configured to receive operational data from the product handling apparatus, the infeed transportation unit, and/or the discharge transportation unit. The communication device of the management module may be configured to transmit control instructions or actuation signals to the product handling apparatus, the infeed transportation unit, and/or the discharge transportation unit. The management module may comprise a processor which may be configured to process the operational data received from the product handling apparatus and generate the control instructions or actuation signals for the product handling apparatus.

The communication device may be configured to receive operational data from the pre-pitching apparatus and the optical scanning device. The communication device may be configured to transmit control instructions or actuation signals to the pre-pitching device and/or optical scanning device.

The management module may be a remote management module.

The management module may be configured to communicate with the rest of the product handling system using wired, wireless or a combination of wired and wireless communication.

The management module may further comprise a data storage device for storing data received via wired and/or wireless communication protocols and data generated by the processor. The processor may be configured to execute computer-executable instructions. The processor may be configured to, when executing the instructions, undertake monitoring and management of the product handling system.

The operational data may comprise sensor readings from any or all of the product handling apparatus, the infeed transportation unit, the pre-pitching apparatus, the container sensing and/or the discharge transportation unit. The operational data may relate to any aspect of the operation of the product handling apparatus, the infeed transportation unit, the pre-pitching apparatus and/or the discharge transportation unit.

The management module may be configured to receive operational targets or parameters that dictate the desired operation of the product handling system. For example, the remote management module may receive data relating to the infeed arrangement of products and the desired discharge arrangement of products.

The management module may be configured to generate control instructions based on the operational data to meet the operational targets.

By example, the discharge transportation unit is the master pitch and pace setting system according to which all infeed and primary handling operations synchronize and match.

The management module may control the operation of the infeed transportation unit, the pre-pitching apparatus and the product handling apparatus to match the throughput (capacity) of the discharge transportation unit.

Further according to an aspect of the disclosure is a method for handling products.

The method may comprise the operation of any of the systems or apparatuses described herein.

The method may comprise pre-pitching infeed products. This may isolate the product handling apparatus from product supply line pressure, group pre-set constant or variable quantities of product containers in uniform close linear pitched or otherwise pre-determined single or multi-row, row/column aligned or nested arrangement and release the said prepared groups at required intervals (pitched groups) into the infeed of the product handling apparatus in a non-pressurized manner.

The method may comprise scanning the position of products. The method may further comprising scanning the orientation of products making up the grouped set of products entering the picking length of the product handling apparatus.

The method may comprise moving a carriage comprising a first and second picking tool to an infeed length of a continuous circuit; picking a first and second product arranged in a first arrangement at the infeed length; moving the first and second product around part of the continuous circuit from the infeed length to a discharge length of the circuit; and placing the first and second product in a second arrangement, different to the first arrangement, at the discharge length.

The carriage may an independent motion controlled carriage. The carriage may be moved through the infeed length. The carriage may synchronise with a first and second product on an infeed transportation unit. The carriage may dynamically pick, while in transit, the first and second product. The carriage may synchronise with a discharge transportation unit. The carriage may dynamically place the first and second product at the discharge length, for example in a secondary packaging assembly.

The method may comprise lifting and lowering the first and second picking tools to execute the picking and dropping functions of the product handling apparatus. The method may comprise changing the arrangement of the first and second product while moving the first and second product from the infeed length to the discharge length by at least one, any, some or all of: rotating the first and second picking tools about a common vertical axis for changing the relative position of the first and second picking tools or products supported therein; translating the first and/or the second picking tools perpendicular or parallel to the circuit at the point on which the carriage is located; moving the individual products row-wise to uniformly standardize the product pitches; upon rotation of the first and second picking tools about a common vertical axis, moving the products of the first and second picking tools row-wise that the side of the first product container aligns with the machine datum; moving the first and second picking tools towards or away from each other for changing the pitch of the first and second picking tools or products supported therein; rotating the first and/or second product about its vertical axis for changing the orientation of the respective product.

The method may further include the use or operation of any of the features described herein in relation to the product handling apparatus or system.

Further according to an aspect of the disclosure is a product handling system. The product handling system may comprise a product handling apparatus. The product handling apparatus may comprise a carriage comprising a first picking tool configured to selectively engage a first product; and a second picking tool configured to selectively engage a second product; wherein the product handling apparatus is configured to pick a first and second product at a first location and place the first and second product at a second location. The product handling apparatus may further comprise a communication device configured to receive control instructions or actuation signals to control the carriage such that it can pick and place the first and second product. The product handling system may further comprise a management module configured to control the product handling apparatus. The management module may comprise a communication device configured to receive operational data from the product handling apparatus and transmit control instructions or actuation signals to the product handling apparatus; a processor configured to process the operational data received from the product handling apparatus and generate the control instructions or actuation signals for the product handling apparatus.

As described above, the communication device may be wired or wireless.

The product handling system may comprise an infeed pre-pitching apparatus to isolate the product handling apparatus from product supply line pressure, to group pre-set constant or variable quantities of product containers in uniform close linear pitched or otherwise pre-determined single or multi-row, row/column aligned or nested arrangement and to release the said prepared groups at required intervals (pitched groups) into the infeed of the product handling apparatus in a non-pressurized manner.

The product handling system may comprise scanning the position and optionally the orientation of individual product containers making up the grouped set of products entering the picking length of the product handling apparatus.

The product handling system may comprise an independent motion controlled carriage comprising a first and second picking tool through an infeed length of a continuous circuit; synchronizing with and dynamically picking while in transit, a first and second product arranged in a first arrangement at the infeed length; moving the first and second product around part of the continuous circuit from the infeed length to a discharge length of the circuit; and synchronizing with and dynamically placing the first and second product in a second arrangement, different to the first arrangement, at the discharge length on or in a secondary packaging in assembly. The product infeed transportation unit, pre-feed apparatus, product scanning system and product handling apparatus may comprise a control module configured to operate the product infeed transportation unit, pre-feed apparatus, product scanning system and product handling apparatus, including the carriage and/or the picking tools mounted thereon. The product handling apparatus may further comprise a wired and/or a wireless communication device operably connected to the control module. The wired and/or a wireless communication device may be configured to receive control instructions which, when executed by the control module, control the product infeed transportation unit, pre-feed apparatus, product scanning system and product handling apparatus, including the carriage and first and second picking tooling such that it can pick, format and place the first and second product. The product handling system may further comprise a management module configured to control the product handling apparatus. The management module may comprise a wired and/or wireless communication device configured to receive operational data from the product handling apparatus and transmit control instructions to the product handling apparatus and a processor configured to process the operational data received from the product handling apparatus and generate the control instructions for the product handling apparatus.

The product handling apparatus, carriage and management module may be as described anywhere herein.

Further according to an aspect of the disclosure is a method for managing a product handling system, the method comprising: receiving operational data from a product handling apparatus; processing the operational data received from the product handling apparatus; generating control instructions or actuation signals for controlling the product handling apparatus; transmitting control instructions to the product handling apparatus.

The method may further comprise receiving data relating to a desired discharge arrangement at a management module. The desired discharge arrangement data may be received as a user input.

The product handling system, apparatus, operational data, control instructions and actuation signals may be as described anywhere herein.

Further according to an aspect of the disclosure is a carriage as described anywhere herein. The carriage may be for use in a product handling apparatus. The carriage may comprise: a first picking tool configured to selectively engage a first product; and a second picking tool configured to selectively engage a second product; wherein the carriage is configured to pick a first and second product arranged in a first arrangement and place the first and second product in a second arrangement, different to the first arrangement.

The carriage may be as described anywhere herein.

Aspects of the disclosure will now be described, purely by way of non-limiting example, with reference to the following drawings.

BRIEF DESCRIPTION OF DRAWINGS

FIGS. 3A to 3D are perspective views of a carriage for use in a product handling system;

FIGS. 8A and 8B show carriages in different configurations;

FIG. 16 depicts example infeed and discharge arrangements for a product handling system.

DETAILED DESCRIPTION OF DRAWINGS

Figure 1:
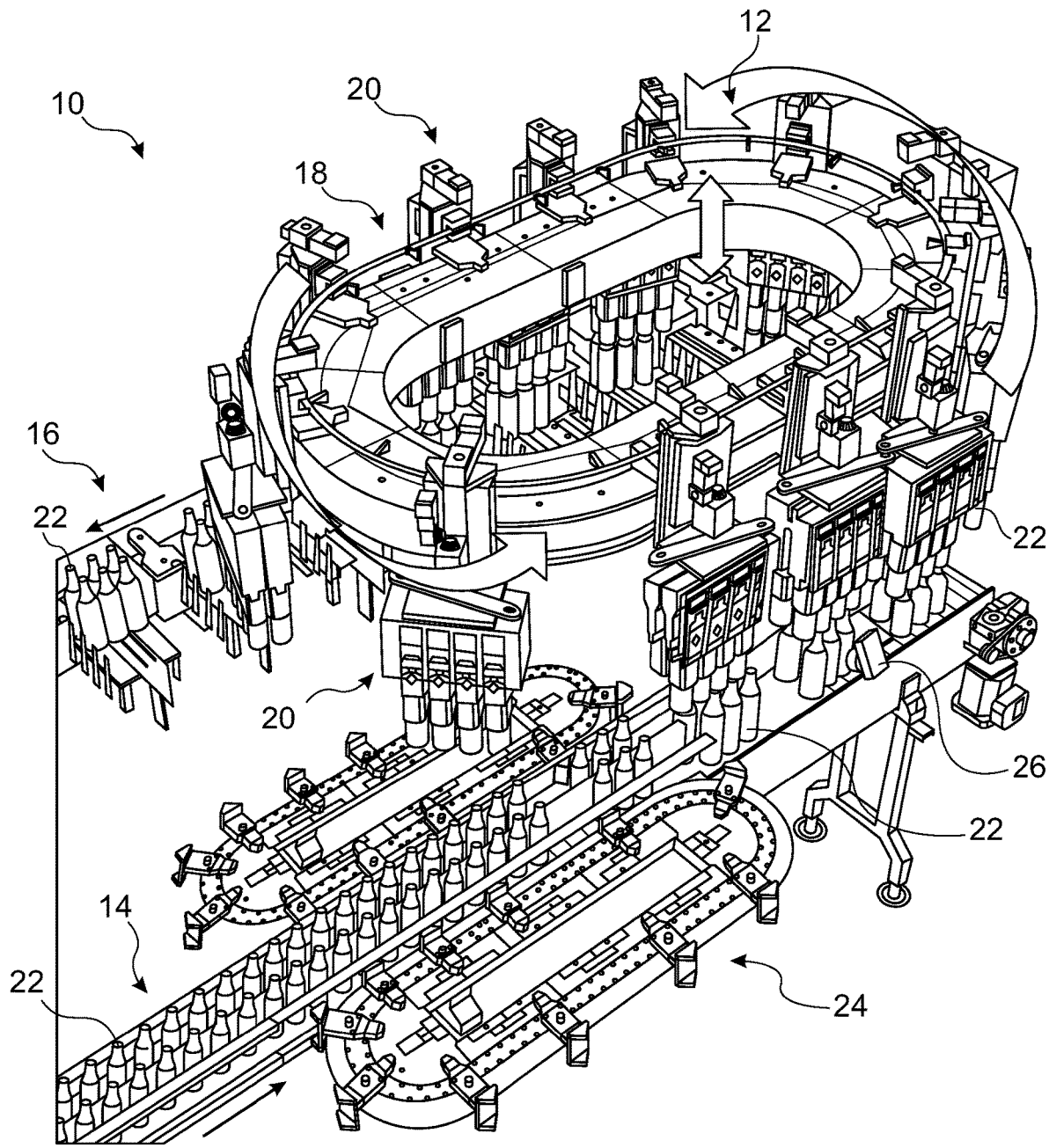
FIG. 1 is a perspective view of a product handling apparatus forming part of a product handling system.

FIG. 1 shows a product handling system 10. The product handling system 10 includes a product handling apparatus 12. The product handling system 10 of FIG. 1 further includes a product infeed transportation unit 14 and a product discharge transportation unit 16. The product infeed transportation unit 14 feeds products 22 to the product handling apparatus 12. The product handling apparatus 12 picks products 22 from the infeed transportation unit 14 and places them on the discharge transportation unit 16. The discharge transportation unit 16 transfers products 22 away from the product handling apparatus, for example for further processing or transportation.

The product handling apparatus 12 is configured to rearrange the products 22 when transporting them from the infeed transportation unit 14 to the discharge transportation unit 16. The product handling apparatus 12 is capable of moving the products 22 from the infeed transportation unit 14 to the discharge transportation unit 16 without rearranging them. However, the product handling apparatus 12 can rearrange the products 22 such that the products discharge from the product handling system 10 are compatible with sequential processing steps, ready for packaging, already packaged, or simply more efficiently arranged.

The specific products 22 shown in the present Figures are bottles. However, the product handling system is configured to be used with a range of different products. Non-limiting examples of products that can be handled by the product handling system include bottles, cans, cartons, boxes, cups and various other physical products. Accordingly, although bottles are shown in the following Figures, the disclosure is not limited as such.

The infeed transportation unit 14 receives a random arrangement of products. The infeed transportation unit 14 may comprise a pre-linearisation device (not shown) to arrange the products into rows. In the present example, the infeed transportation unit 14 first reorganises the random arrangement of products 22 into two rows of products 22. The two rows of products 22 of the present example are continuous and under line pressure—that is, there is no spacing between the products 22.

The infeed transportation unit 14 may comprise a pre-pitching device 24. The pre-pitching device is configured to pitch the products into separate arrangements of products 22. The pre-pitching device is configurable and so can be configured to pitch the products into groupings of largely any number in a variety of arrangements. In the example shown in FIG. 1, the pre-pitching device 24 separates the continuous two rows of products 22 into discrete arrangements of two sets of 1×3, totaling 6 products 22, spaced apart and transported opposite each other to the infeed length of the product handling apparatus. The pre-pitching device 24 is configured to pitch the continuous rows of products into adjacent arrangements of two sets of 1×3, totaling 6 products 22 such that there are defined gaps therebetween.

The infeed transportation unit 14 further may comprise an optical scanning device 26. In the present example, an optical scanning device 26 is located on both sides of the infeed transportation unit 14. Each optical scanning device 26 is configured to scan products 22 passing the scanning device 26 in order to determine the relative location and/or orientation of the products 22. The optical scanning device 26 may be configured to determine the location and orientation of products 22 on the infeed transportation unit 14 and communicate this data to a remote management module. The information on the location and orientation of products 22 on the infeed transportation unit 14 is used to synchronize and control the motion and tooling action of the carriages 20 to dynamically pick up the products 22, while in transit, and rearrange them as required while moving them from the infeed transportation unit 14 to the discharge transportation unit 16 and in a synchronized and motion controlled manner of the carriage and the picking tooling, dynamically deliver the re-formatted products onto or into packaging in assembly, while in transit, on the outfeed transportation unit.

The product handling apparatus 12 comprises a track 18. In the example of FIG. 1, a plurality of carriages 20 are arranged on the track 18. Each carriage 20 comprises a plurality of product picking tools 28, each configured to selectively engage and disengage a product 22. The picking tools 28 are arranged on an underside of the carriage 20, to interface e.g. with an upper portion of the products 22 on the infeed transportation unit 14.

Figure 2:
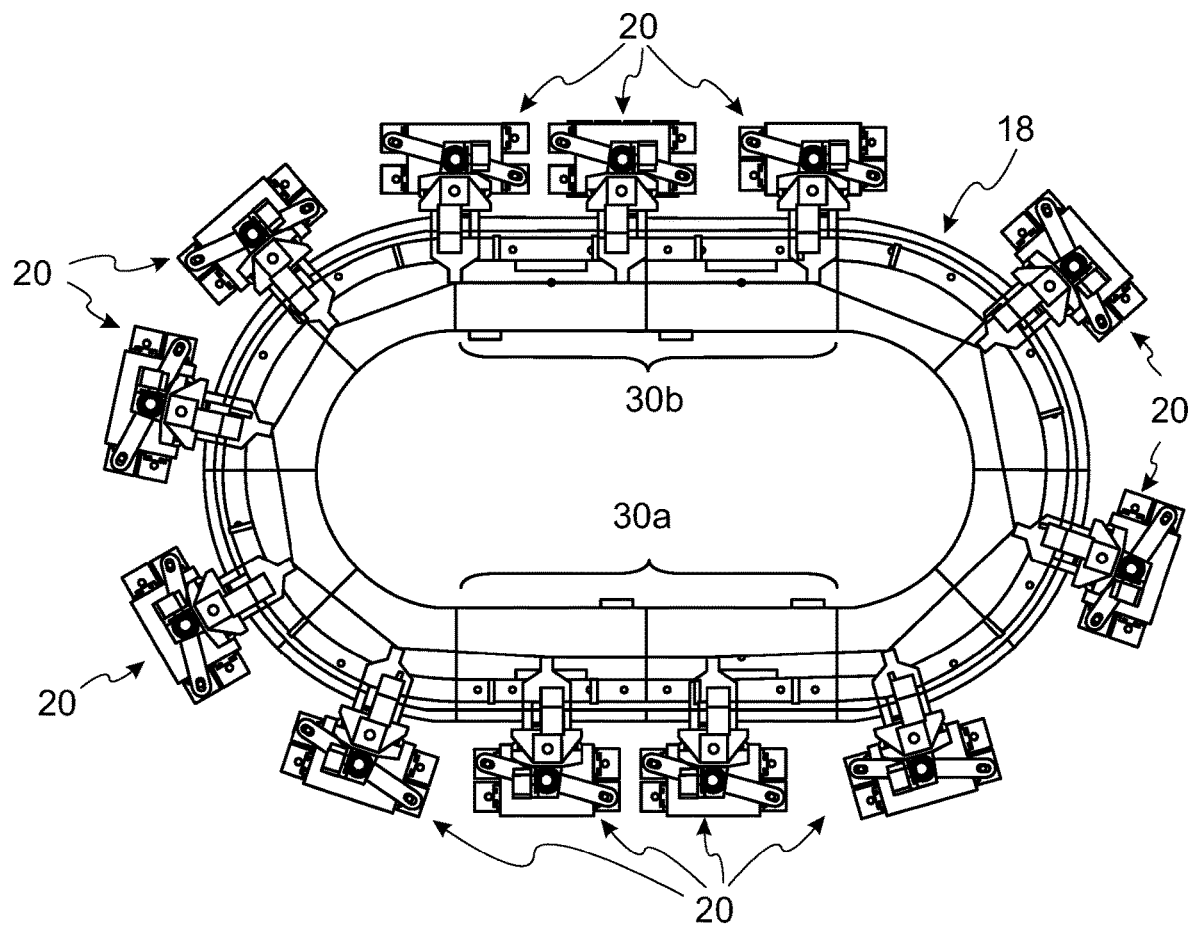
FIG. 2 is a top view of a product handling apparatus for use in a product handling system.

With reference to FIGS. 1 and 2, the track 18 defines the course taken by the carriages 20. The track 18 defines an infeed length 30*a* that corresponds to the infeed transportation unit 14. The infeed length 30*a* is a portion of the track 18 arranged parallel to the infeed transportation unit 14. In the present example, the infeed length 30*a* is arranged substantially above the infeed transportation unit 14. The presence of the infeed length 30*a* allows carriages 20 to move along the infeed transportation unit 14 during operation—for example to match infeed speeds and allow smooth picking of products 22 without having to stop the infeed transportation unit 14. The presence of an infeed length 30*a* may, among other things, contribute to the continuous running of the infeed transportation unit 14.

The track 18 also defines discharge length 30*b* that corresponds to the discharge transportation unit 16. The discharge length 30*b* is a portion of the track 18 arranged parallel to the discharge transportation unit 16. In the present example, the discharge length 30*b* is arranged substantially above the discharge transportation unit 16. The presence of the discharge length 30*b* allows carriages 20 to move along the discharge transportation unit 16 during operation—for example to match discharge speeds and allow smooth placement of products 22 without having to stop the discharge transportation unit 16. The presence of discharge length 30*b* may, among other things, contribute to the continuous running of the discharge transportation unit 16. Additionally, the presence of discharge length 30*b* may ease the use of "double drops", in which products 22 from multiple consecutive carriages 20 are placed in a single discharge grouping or products from a carriage are distributed between two discharge product grouping as part of the packaging format or pattern assembly processes. This is discussed in more detail below.

Infeed and discharge lengths 30*a* 30*b* also allow the product handling apparatus 12 to use the motion provided between the track 18 and the carriage 20 to both move the products from the infeed transportation unit 14 to the discharge transportation unit 16, and independently match the infeed transportation unit 14 and separately the discharge transportation unit 16 speeds. This avoids the need for separate degrees of motion and actuation components for these two actions—a single linear motor (for example) can provide the movement for transporting the product from the infeed length to the discharge length and match the speed of the picking tool to the infeed/discharge transportation units.

The product handling apparatus 12 is configured such that the carriages 20 pick products 22 from the infeed transportation unit 14 and place them on the discharge transportation unit 16. Between picking and placing the products, the carriages 20 traverse a portion of the track 18, which guides the carriages 20 from the infeed transportation unit 14 (and corresponding infeed length 30a) to the discharge transportation unit 16 (and corresponding discharge length 30b).

After placing the products 22 at the discharge transportation unit 16, the carriages 20 continue around the track 18 to return to the infeed length 30a to pick up more products 22.

The track 18 of this example is a closed loop that forms a continuous circuit about which the carriages 20 move. The circuit being continuous allows the carriages 20 to move along the infeed length 30a and discharge length 30b in only a single direction in a continuous manner.

In the examples shown, the track 18 is a closed loop and defines the circuit. However, in other examples the track may not be a closed loop and the circuit may comprise addition elements, e.g. a carriage buffer or shuttle to provide the continuity of the circuit. The circuit may also be a virtual closed loop.

In addition to moving the products from the infeed transportation unit 14 to the discharge transportation unit 16, the carriages 20 are also configured to move the products from a first arrangement, in which the products 22 were picked up from the infeed transportation unit 14, to a second arrangement, in which they are placed on the discharge transportation unit 16. The carriages 20 are configured to rearrange the products 22 in a plurality of different ways, as discussed with reference to FIGS. 3A to C.

This allows the product handling system 10 to receive the products 22 in a first format, and discharge the products 22 in a second format. For example, products may be received on the infeed transportation unit 14 in a random arrangement with random orientations. The products 22 may be arranged into two rows (not shown in FIG. 1), before being pre-pitched by the pre-pitching device 24 as described above. The products 22 can then be rearranged further when moving from the infeed transportation unit 14 to the discharge transportation unit 16 by the product handling apparatus 12. The product handling apparatus 12 may pick the products 22 in a first arrangement at the infeed length and place the products 22 in a second arrangement at the discharge length.

The products 22 may be placed at the discharge length in a format suitable for packaging or compatible with further processing. The products 22 may be rotated about a common vertical axis to change their relative positions, moved towards or away from each other to adjust the pitch between them, rotated about their respective vertical axes to orient each product, translated horizontally or a combination of all of these rearrangements.

The specific degrees of freedom provided by the carriages 20 are discussed in more detail with respect to FIGS. 3A to 3C.

As the products 22 can be rearranged between being picked and placed, products can be placed directly onto or into secondary packaging (e.g. crates, boxes, etc. . . . ) in a packaging-compatible, or further processing-compatible arrangement. Products 22 can be re-pitched to be closer together to reduce packaging size. Products 22 can be reoriented so that product labels face a uniform direction or in a coordinated direction for example, to suit front, back or side apertures or visibility in the secondary packaging for presentation purposes. Groups of products 22 can be rotated about a common axis, for example for use with packaging requiring a different number of rows to that of the infeed transportation unit 14. Products 22 can be laterally moved with respect to the discharge length of the track 18 to align with machine datum of the discharge transportation unit 16.

As exemplified by the plan view in FIG. 2, the track 18, being example of a circuit of the present disclosure, has a plurality of carriages 20 arranged thereon. The track 18 of this example includes a straight infeed length 30a, arranged to correspond to the input transportation unit 14. The track 18 of this example also includes a straight discharge length 30b, arranged to correspond to the discharge transportation unit 16. In other examples, the infeed and discharge lengths may be curved. The infeed and discharge lengths 30a 30b are arranged such that carriages 20 can travel along the respective length 30a 30b to match the motion of the corresponding transportation unit 14 16.

FIG. 2 shows variable spacing between adjacent carriages 20. As will be described in more detail below, the carriages 20 are independent operable on the track 18 and, as such, are pitch and pace adjustable in that they can have a different speed and acceleration/deceleration to adjacent carriages 20 such that a first carriage 20 can approach or move away from an adjacent carriage 20. This provides increased flexibility, in particular with respect to discharge groupings of products 22.

Turning now to FIGS. 3A to 3D, a carriage 20 of the disclosure is shown in detail.

The carriage 20 comprises a frame 38 that supports and houses the other carriage components including actuation, power, sensing and communication systems. The frame 38 of the carriage 20 is attached to the mover 32 of the linear drive which is configured to support and propel the carriage, tooling and payload about the track 18.

The mover 32 of the linear drive (which may be considered part of the carriage 20) comprises a suitable housing, roller arrangement and mounting of permanent magnets to maintain close interaction of the permanent magnet flux with that of the coils of the linear motors while simultaneously supporting the carriage tooling and payload as the mover traverses about the track 18, navigating along straights, curves, clothoids and transitions there between. a pair of horizontal, vertically-spaced flanges, configured to receive a part of the track 18 there between. The frame 38 is configured to transfer the mechanical load from the carriage 20 to the mobile mover 32, mounted track 18.

In the present example, a linear motor drives the mover 32, upon which the carriage 20 is mounted, around the track 18. A first, mover 32, part of the linear motor is provided, and a second, stator, part of the linear motor is provided by the track 18. Using a linear motor allows the carriage 20 to be independently moved around the track 18 to a high degree of accuracy. This allows carriages 20 to approach each other in order to place products in a single product formation, as will be discussed in more detail later.

The linear motor system includes statically mounted linear stators (motor coils) upon which or opposite which the rail 18 is mounted, acting on magnets in the track-mounted movers 32, upon which the carriages 20 are mounted. The magnets within the movers 32 are maintained in close proximity to the motor coils within the linear drive motors 31 while moving along the track 18.

Suitable linear motor systems for providing the track 18 and mover 32 include, for example, the iTRAK Intelligent Track System from Rockwell Automation™ and the eXtended Transport System from Beckhoff Automation™.

Power for the linear motor 31 driving the mover 32, upon which carriage 20 is mounted, is provided to the track 18 via a wired connection.

The linear motor system comprising a series of linear motors 31 along and optionally supporting the track, along with controller, firmware and software, controls the movement of the carriage 20 around the track 18, and is shown as movement "A" in FIG. 3C.

The carriage 20 comprises a number of electrically powered systems (e.g. actuation, grippers, sensors, pneumatic/vacuum pumps, motors (various) and communication systems). Power for these systems may be provide by preferably any untethered means of power supply such as (preferably) an inductive, contactless, power supply system or a slip rail power supply system, to the carriage. The power for the carriage 20 is therefore provided in an untethered fashion where the independent movement of the carriage about the track is unrestrained (i.e. unhindered by any power supply cables or cable management system). In the case of an inductive power supply, power is supplied through the use of a carriage 20 mounted power pickup 34, which is configured to traverse opposite an inductive power cable 36 system (two cables) mounted parallel to each other and parallel to the track 18. The carriage 20 mounted power pickup 34 is configured to travel with the carriage 20 in more or less constant proximity to the inductive power cable 36 as the carriage 20 moves around the track 18 to allow continuous power to be inductively provided to the carriage 20 to power the said carriage systems mounted thereon. This connection can be best seen in FIG. 3D.

The carriage 20 comprises a communication and control system. The communication and control system is configured to communicate with a central management module and control the operation of the carriage. This communication and control system comprises a wireless receiver (Client), wireless transmitter (Master), a control module and a data storage device.

The wireless master and client are characterised as being parts of a secure, bi-directional, deterministic, low latency, low jitter, synchronized telecommunication system suitable for machine control via communication of real-time, synchronous signals and for communication of machine setup parameters, status and operation confirmation feedback, as well as for transmission of non-time critical, asynchronous performance and machine condition monitoring information.

The wireless receiver is configured to receive control instructions from a product handling management module. The management module forms part of the product handling system 10 and may be a central server configured to control product handling operations. The control module is configured to execute the control instructions to control the operation of the carriage 20. For example, the control instructions may comprise instructions relating to the movement of the carriage around the track and the relative arrangement and movement of the picking tools 28 of the carriage. The wireless transmitter is configured to transmit data, for example to the management module. The data may comprise data relating to the location, speed and acceleration of the carriage 20, the arrangement of the picking tools 28 and any other sensed data relating to the products 22 or product handling system 10.

The communication and control system of the carriage 20 facilitates independent control of the carriage 20 centrally. This increases the flexibility and efficiency of the product handling system.

The carriage 20 comprises a plurality of picking tools 28. In the example of FIGS. 3A to 3D the carriage comprises eight picking tools 28 in two rows and four columns. The picking tools are located on a lower side of the carriage 20 such that they can engage products 22 located underneath the carriage 20.

Each picking tool includes an engagement portion configured to engage and grip a range of products. Examples of engagement portions include grippers and pneumatic or electric actuated tulips. The electrically powered tulips may be linear or rotary solenoid or motor, actuated Grippers or tulips may be mechanically or pneumatically operated in order to engage e.g. an upper portion of a product 22. An example of known engaging portions suitable for use with the present example include pneumatic arrangements including a direct pneumatic or piston energized (pneumatic or means of said electric solenoid or motor actuation) of an internal profile arranged to contact an upper circumference (e.g. the neck region) of the product and a pneumatic arrangement configured to create a pressure differential to clamp the product within the engagement portion.

In the illustrated example, the engagement portion is configured to engage the following range of products without needing to change parts: aluminium, glass and PET bottles (with diameters from 56.3 to 85.0 mm and heights from 183 to 299 mm); cans (with diameters from 53.0 to 66.5 mm and heights from 106 to 194 mm). Suitable products include bottles with long and short necks, of 250 ml to 750 ml, and cans with 200 (50 mm), 202 (52 mm), 206 (57 mm) lids.

In this specific example, each picking tool 28 comprises a keyed, spring loaded, hollow shaft, sliding within the bore of a hollow shaft orientation motor, mounted on or embedded in the carriage. The keyed, spring loaded, hollow shaft is rotationally driven (see below discussion of reorienting the individual picking tools 28) while sliding axially within the bore of the hollow shaft motor. The hollow shaft is used to route services such as power, control, vacuum and pneumatics through to the engagement portion of the picking tool 28. The hollow shaft is also used to feedback sensor signals back from the engaging portion of the picking tool 28. The arrangement could also comprise the said spring loaded, siding, hollow shaft tulip of gripper mounting being alternatively rotationally driven via an external gear and pinion drive arrangement with a solid shaft orientation drive motor mounted next to the hollow shaft tulip or gripper mounting.

Each picking tool 28 of the present example also includes a controller configured to control rotational acceleration, speed, deceleration and brakes for the rotational orientation movement of each picking tool 28. The picking tools 28 also include an encoder to provide inline feedback of the actual angular rotation of the products 22 and sensors to confirm connections and engagement with a target product 22.

As mentioned above, the carriage 20 is configured such that the arrangement of the picking tools 28 can be altered. The following comments regarding the flexibility and ease with which the picking tools 28 can be rearranged applies to all of the picking tool 28 degrees of freedom discussed below.

The arrangement of the picking tools 28 can be changed while the carriage 20 is moving products 22 from the infeed transportation unit 14 to the discharge transportation unit 16.

For example, the picking tools 28 can dynamically pick a plurality of products from the infeed transportation unit 14 in a first arrangement and dynamically place the plurality of products on the discharge transportation unit 16 in a second, different, arrangement.

This allows the product handling apparatus 12 to rearrange products into an arrangement suitable for secondary packaging or further processing. For example, the product handling system 10 can receive products in a random arrangement and discharge products in a chosen arrangement. In fact, the product handling system 10 can place products 22 directly into or onto secondary packaging arranged on the discharge transportation unit 16 in a closely arranged row/column or nested pattern arrangement.

The picking tools 28 can be selectively rearranged. For example the picking tools 28 can be rearranged to pick different arrangements of products at the infeed length 30a. The carriage 20 is configured such that the picking tools 28 can be rearranged as the carriage 20 moves around the track 18. The carriage 20 is configured such that the picking tools 28 can be rearranged during use, e.g. on-the-fly. The picking tools 28 can be rearranged without having to remove the picking tools 28 from the carriage 20 or the carriage 20 from the track 18. As the picking tools 28 can be rearranged as the carriage 20 moves around the track, there is little or no downtime associated with changing change parts when switching between handling different primary products (type, size (diameter, height), material, mass) and/or changing the packaging format or pattern arrangement.

The arrangement of the picking tools 28 (and hence any products 22 supported therein) can be changed in many ways.

The plurality of the picking tools 28 (and hence any products 22 supported therein) can be rotated as a whole, for example through a centreline of the carriage (see rotation "C" in FIG. 3C). This changes the relative position of a first picking tool 28 relative to a second picking tool 28. This provides means of switching a row column arrangement to a column row arrangement that a format may be presented wide side leading as opposed to (for example) narrow side leading. This will be discussed in more detail below.

In the example of FIGS. 3A to 3D, the carriage 20 comprises an actuator 42 (for example a rotary motor) and a pair of mitre gears 44 connected to a rotating arm 46 arranged to rotate the formation of picking tools 28.

The pitch (i.e. the centre-to-centre spacing) of the picking tools 28 (and hence any products 22 supported therein) can be changed—for example increased or decreased—in a first direction. The first direction may be perpendicular to the track 18, infeed transportation unit 14 or discharge transportation unit 16 (see pitch alteration "E" in FIG. 3C). This can increase or decrease the pitch between adjacent rows of the picking tools 28.

The pitch (i.e. the centre-to-centre spacing) of the picking tools 28 (and hence any products 22 supported therein) can be changed—for example increased or decreased—in a second direction. The second direction may be perpendicular to the first direction. The second direction may be parallel to the track 18, infeed transportation unit 14 or discharge transportation unit 16 (see pitch alteration "G" in FIG. 3C). This can increase or decrease the pitch between adjacent columns of the picking tools 28.

The pitch adjustment (in either or both directions) is achieved through the inclusion of an actuator, or plurality of actuators arranged to effect the relative movement between picking tools and the relative movement of the group of picking tools to one side of the carriage 20 horizontal side. The latter movement being used upon global rotation "C" of the carriage tooling about the common axis to align the side of the nearest (first) product container with the machine datum. Suitable examples of such arrangements may include electric motors with suitable support infrastructure (e.g. rail and slides upon which the picking tools are mounted, coupled to a progressive lead screw for repitching the picking tools relative to each other, in combination with an auxiliary adjustment to position the whole group. Alternatively as shown in the figures, the picking tool mountings may via a linear length of linear drive with each picking tool mounted on an independent motion and position controlled mover, thus enabling single action inter-picking tool repitching as well as group picking tool positioning via one device per slide of picking tools. etc).

The orientation of each individual picking tool 28 (and hence any products 22 supported therein) can be changed. Each individual picking tool 28 is configured to rotate about its own longitudinal axis (see orientation rotation "F" in FIG. 3C). Products supported in a picking tool 28 can be reoriented by rotating the picking tool 28 about a vertical axis through its centre, for example to ensure that the label of the product is facing the desired direction when being placed into secondary packaging.

To facilitate rotation of individual picking tools 28 and the products supported therein, each picking tool 28 has a compact motor (e.g. stepper or torque motor), not shown in the Figures, with sufficient torque, speed, rotational control and responsiveness to overcome the stiction, friction and inertia of the mechanism and product to perform and complete the allotted rotational orientation of the product while the product is in transit between the infeed picking and outfeed delivery. The motor may be attached or embedded (stator mounted directly to save space and weight) in the carriage.

The optical scanning device 26 scans products 22 on the infeed transportation unit 14 and communicates data relating to confirmation of the presence, the position and orientation of the products 22 to a remote management module. The remote management module generates control instructions that are sent to the control system of the carriage 20. The control system processes the control instructions and operates the rotation of the corresponding picking tools 28 to correctly orient the products 22 supported therein, to within a degree of the targeted orientation and retains the orientation thereupon until the product is released from the gripper or tulip tooling.

The lateral positioning of the picking tools 28 can also be changed. The lateral positioning of the picking tools 28 in a direction perpendicular to the point of the track 18 on which the carriage 20 is located (see lateral movement "D" in FIG. 3C) may be dynamically adjusted while the carriage is stationary or in motion. The lateral positioning of the picking tools 28 as a group, is adjusted with respect to the point of the track on which the carriage is located, such that the side of the product container nearest the packaging machine is aligned with machine datum despite variation in that movement as a function of the diameter, shape or size of the product container being handled. The lateral position of the group of picking tool 28 is thus altered as a whole in this manner. The lateral positioning of the picking tools 28 can be altered within a plane. The plane of movement is typically parallel to the plane of the track 18 (i.e. horizontal in the example).

Additionally, the picking tools 28 being moveable perpendicular to the track 18 allows the product handling apparatus 12 to align with the machine datum—i.e. a nominal reference axis or plane with which products should be aligned for proper processing.

The picking tools 28 in the present example are supported by a support plate 48 which is connected to an actuator configured to control movement of the support plate 48 and the corresponding picking tools 28 in a direction perpendicular to the track (see movement "D" in FIG. 3C).

The picking tools 28 as a group can also be dynamically and automatically held at any desired elevation along between the vertical limits of actuation or moved vertically up or down in a motion-controlled manner (acceleration/deceleration/velocity) that the picking head may for example execute a picking or a dropping or any other intermediate or repeated operation. Vertical movement of the picking tools 28, as actuated via geared motor 35 allows the picking tools 28 to descend onto the top of a product 22 to engage the product 22, before ascending to lift the product 22 from the infeed transportation unit 14. Once the picking tools 28 have moved to the discharge transportation unit 16, the pickings tools 28 again descend to release the products onto the discharge transportation unit 16, before ascending to move away from the discharge transportation unit 16 without colliding with products thereon.

In addition to being moveable between defined "low points" at which the picking tools 28 engage and release products 22 on the infeed and discharge transportation units 14 16, respectively, and "high points" at which the picking tool 28 moves the products 22 from the infeed to the discharge transportation unit 14 16, the product handling apparatus 12 of the present example is configured such that these points can be dynamically adjusted. That is, the product handling apparatus is configured to adjust the vertical movement profile of the picking tools 28 as they move around the track 18. The product handling apparatus 12 of the present example is configured to adjust the vertical position of the picking tools 28 when they are positioned to engage and release products 22 and may be adjusted for minimized movement depending on the type of primary product container being handled (e.g. long neck bottles via tulips vs beverage cans via a can lid gripper or suction cup).

The product handling apparatus 12 can therefore adjust the height profile of the picking tools 28 to handle different products 22 with different heights. For example, during a first operation the product handling apparatus 12 can pick, rearrange and place aluminium cans, which have a relatively small height. The height profile of the picking tools 28 can then be adjusted to allow the same product handling equipment 12 to handle 750 ml bottles, which have a much greater height. As with the other adjustments, the product handling apparatus is configured to make this adjustment selectively and on-the-fly to avoid unnecessary downtime when switching between production of different primary products (type, shape, size (diameter/height), material, mass etc.).

In the present example, all of the picking tools 28 on a carriage 20 move vertically together. The carriage 20 includes a vertical actuator 50 configured to move the majority of the carriage 20 relative to the bracket 38 and linear drive mover 32 (and hence track 18 and transportation units 14 16), to raise and lower the picking tools 28.

In other examples, each picking tool 28, or smaller sub-groups of picking tools 28 may be configured for controlled independent vertical movement (e.g. relative to the track 18, transportation units 14 16 and each other). This may be achieved by the introduction of individual linear actuators for each picking tool 28, located above the respective picking tool 28 in the carriage 20. Individual vertical control of each (or small groups of) picking tools 28 may increase flexibility and, for example, allow different products to be picked by a single carriage 20.

As with the other degrees of customisability, the vertical movement of the picking tools 28 in the present example is controlled by a management module. The remote management module generates control instructions that are sent to the control system of the carriage 20. The carriage 20 processes the control instructions and controls the vertical movement of the picking tools 28 accordingly.

The presently described product handling apparatus 12 is configured such that the track 18 can be raised and lowered. The track 18 is configured to be moved vertically, along with the carriages 20 arranged on the track 18. This provides a further degree of flexibility, and is primarily used to set the machine height for the height of the primary containers being processed (i.e. between 105 mm shortest Can and 300 mm tallest glass bottle for the present example). Should a different container handling system be used than fixed height container base supported product handling transportation units, the machine height adjustment could also be used to match the variable requirements of the infeed/discharge transportation unit heights.

The picking tools 28 of the present example are configured to be moved dynamically and automatically in position and motion controlled fashion vertically, laterally (cross row-wise), rotated as a group, individually rotated, off-set as a group rail-wise and pitch-adjusted in two dimensions. Each of these adjustments is independent of the other adjustments. These adjustments can be conducted independently or simultaneously. Each of these adjustments may be made while stationary or while the carriage 20 is in motion around the track 18. Each of these adjustments may be made selectively, in response to a control instruction being received or generated. This provides the product handling apparatus 12 with great flexibility.

Figure 4A:
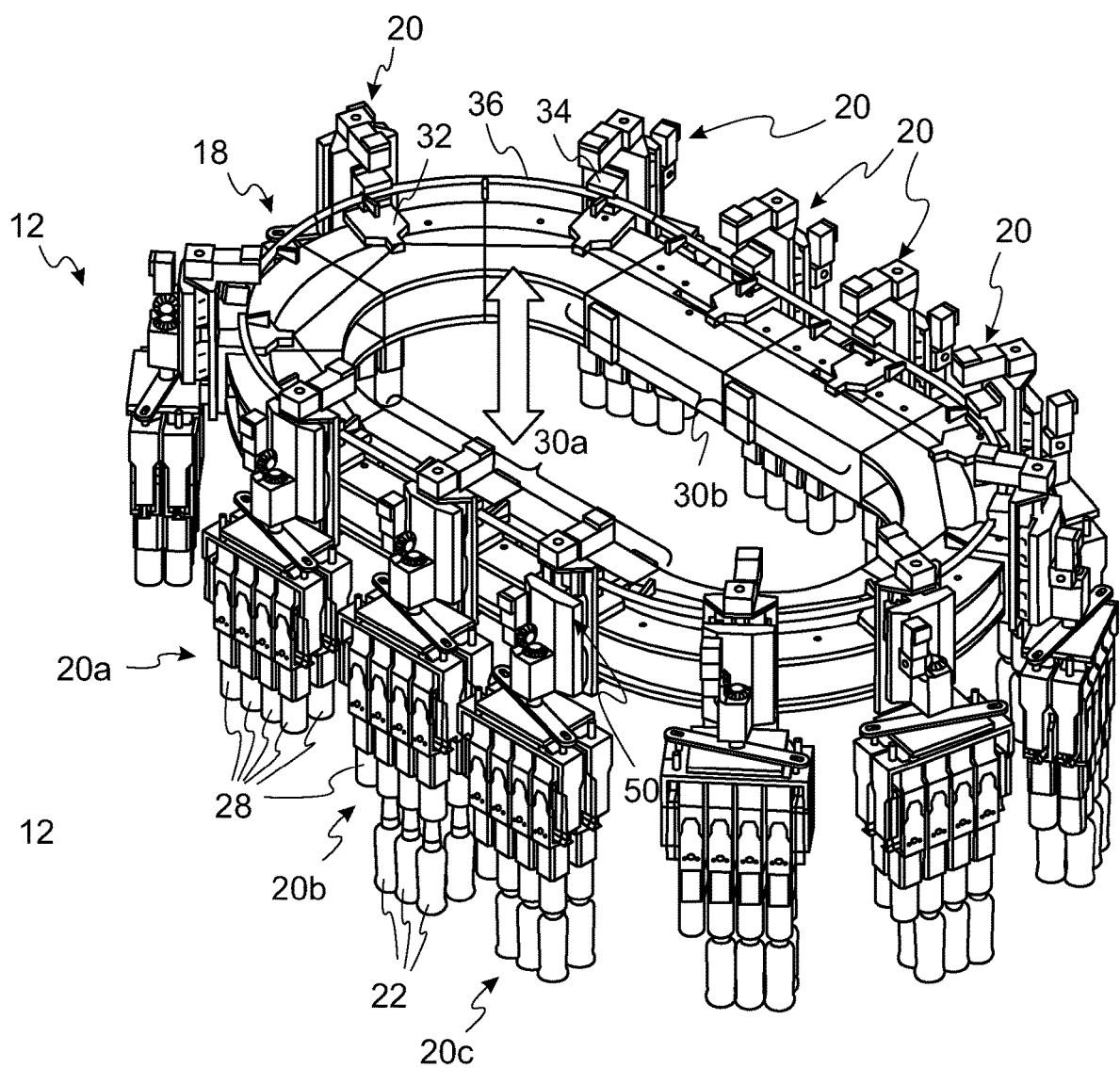
FIGS. 4A and 4B are perspective views of a product handling apparatus.
Figure 4B:
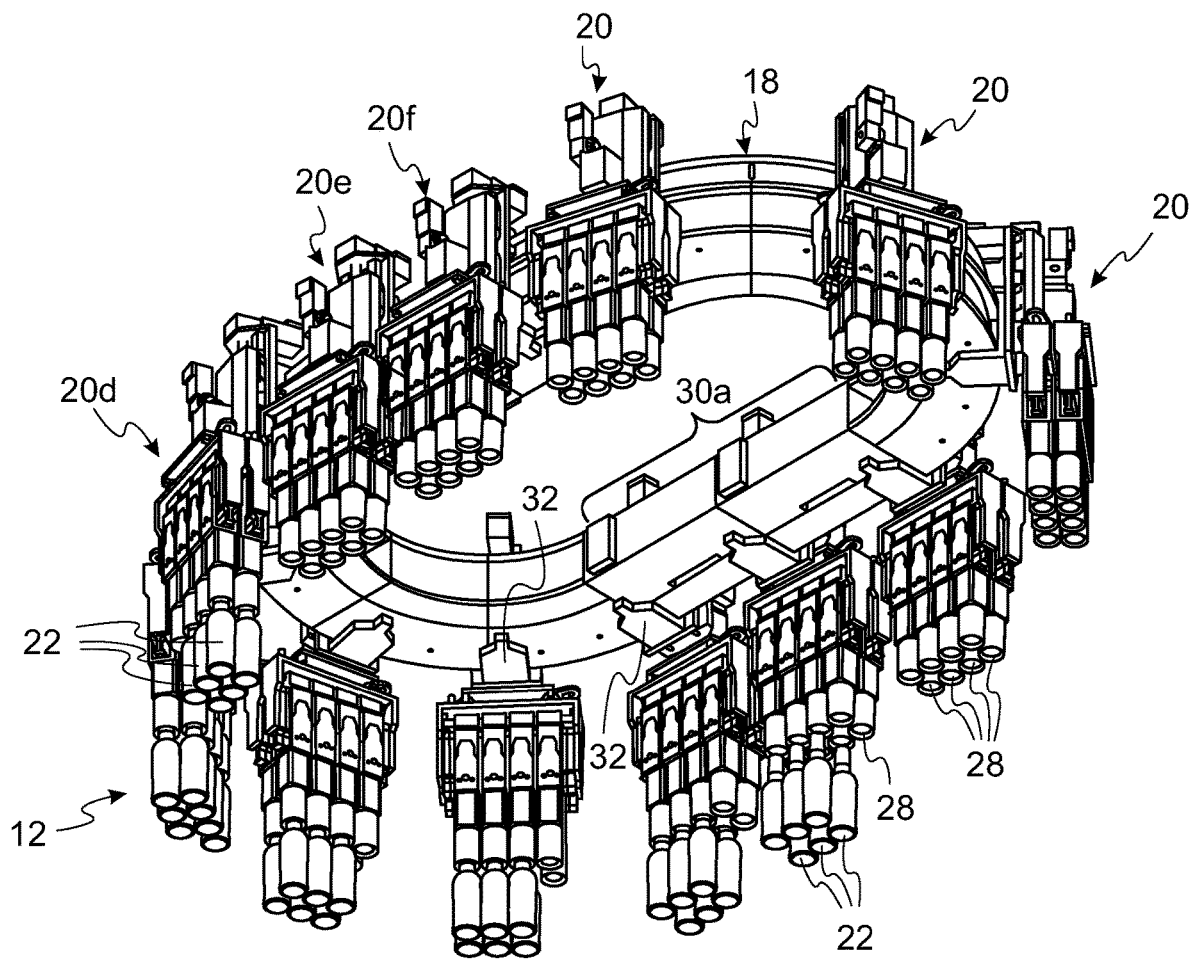

Turning now to FIGS. 4A and 4B, top and bottom perspective views of a product handling apparatus 12 are shown. The product handling apparatus 12, in the exemplary, includes twelve carriages 20 arranged on a track 18 comprising two parallel sides (corresponding to the infeed length 30a and discharge length 30b) connected by semi-circular ends. The carriages 20 travel around the track 18 in an anti-clockwise direction as viewed in FIG. 4A.

The capacity of such primary handling apparatuses may be adjusted by the size, dimensions, radii, track profile, power, propulsion forces, speeds attainable, rates of acceleration/deceleration, precision and repeatability of the independent mover transportation device, as well as the number of carriers and toolings mounted and managed thereon. (e.g. the track profile may be longer and may have semi-circular, clothoid or obround ends to provide more or less area for picking, reformatting and discharge or multi-drop discharge functions).

The cross section of the independent mover transportation device (e.g. Linear Drive) may be varied for additional power, force and load (mover, tooling and payload) carrying capacity. Two of more independent mover transportation devices may be stacked one above the other and operated in tandem with mechanically coupled movers supporting the carriage 20 that adequate cantilevered load carrying capacity of the carriage, tooling and payload (product containers) may be handled.

To meet power requirements, while also meeting certain compact dimension and pitch constraints such systems may include one of more slip rail or inductive power supply systems, stacked one above the other and/or with one or more power pickups per conductor, per carriage.

FIG. 4A shows a first carriage 20a arranged at the start of the infeed length 30a. The picking tools 28 are not yet engaged with products 22. In this case, the products are pre-pitched into groups of six (not shown). This is likely dictated by discharge requirements—e.g. final secondary package format or pattern.

The picking tools 28 of carriage 20a are arranged to engage with six products 22 (not shown in FIG. 4A) on the infeed transportation unit 14, as discussed above. A second carriage 20b, around the midpoint of infeed length 30a, is in the process of engaging with six products 22. The movement of the carriage 20b along the infeed length 30a matches that of the products 22 along the infeed transportation unit 14 and the picking tools 28 are aligned with the corresponding products 22. A third carriage 20c is engaged with, and supporting six products 22, and is leaving the infeed length 30a portion of the track 18. The vertical actuator 50 has moved the picking tools 28 downwards such that they mate with, engage and clamp the products 22 within the engagement portion of the picking tools 28. As the carriage 20c leaves the infeed length 30a portion of the track 18, the vertical actuator will act to lift the picking tools 28 and products 22 to transfer them to the discharge transportation unit 16. It can be seen that in the example of FIGS. 4A and 4B, not all of the picking tools 28 of each carriage are used to support a product 22.

As the products 22 are moved from the infeed length 30a to the discharge length 30b, the picking tools 28 (and hence products 22) are rearranged, for example to reduce the pitch between adjacent rows and columns of products 22. This provides a smaller overall footprint for the group or formation of products 22, and thus provides a more efficient arrangement for secondary packaging (not shown). The products 22 are also reoriented, to ensure labels on the products are facing a uniform direction in the secondary packaging.

FIG. 4B shows a carriage 20d near the beginning of the discharge length 30b. Six of the eight picking tools of the carriage 20d are supporting products 22. The vertical actuator 50 has lowered the picking tools 28 such that the products 22 are located on the discharge transportation unit 16 (not shown).

The picking tools 28 of the neighbouring carriage 20e have released the products 22, for example by removing or reversing the pneumatic pressure difference in, or mechanically actuating each picking tool 28 to release, that was responsible for clamping of the product 22. The carriage 20f is located towards the end of the discharge length 30b and the vertical actuator 50 has again lifted the picking tools 28 away from the discharge transportation unit 16 (not shown) to avoid collisions with any products 22 thereon. The carriage 20f will round the corner of the track 18 and approach the start of the infeed length 30a, at which time the cycle will repeat.

Figure 5:
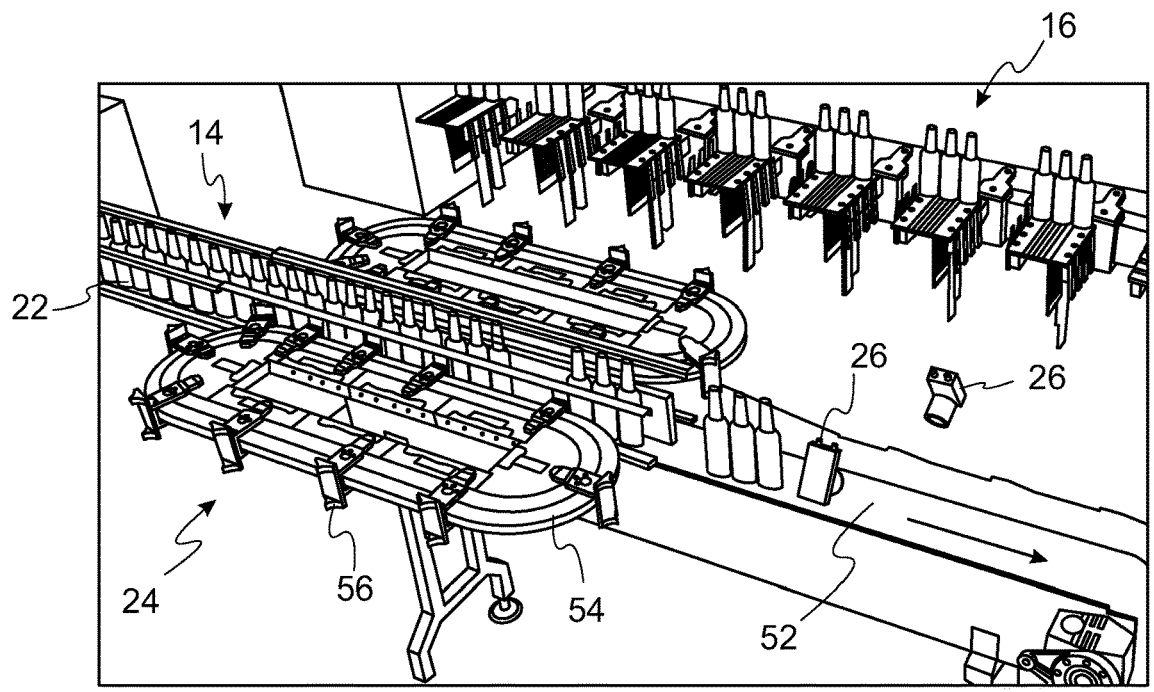
FIG. 5 shows an infeed transportation unit.

FIG. 5 depicts an infeed transportation unit 14. The track 18 and carriages 20 of the product handling apparatus 12 are omitted for clarity.

In the exemplary, the infeed transportation unit 14 comprises a moving belt 52 on which products 22 are received. The belt 52 moves the base supported products along the infeed transportation unit 14 towards the carriages 20 of the product handling apparatus 12.

Prior to the features shown in FIG. 5, products are received and ordered into a chosen number of rows. In the illustrated example, the products are organised into a single row for the packaging of 1-way (single row packaging formats).

The infeed transportation unit 14 comprises a pre-pitching device 24. The pre-pitching device 24 of the present infeed transportation unit 12 comprises a pair of independent mover transportation tracks (e.g. linear drives) 54, although only one track is operational when a single row of products is run through the input transportation unit for the packaging of the said 1-way (single row packaging formats (e.g. 1×2, 1×3, 1×4, 1×5)). The two independent mover transportation tracks (e.g. linear drives) 54 are located on either side of the belt 52, with a longitudinal side of the track 54 running alongside the belt 52. A plurality of mover mounted separators 56 are located on each track 54 and are configured to travel around the track 54. The first track 54 with separators 56 acts to engage the single file row of product, hold back the product supply line pressure and release batches of primary product containers, comprising the desired quantity of containers, at the desired intervals into the picking area of the product handling apparatus 18. Both sets of tracks 54 and separators 56 operate in the same way.

The separators 56 are shaped to engage the queued row of single file containers as they enter the pre-pitching apparatus. The separators 56 are driven around their respective track 54 following a motion profile to suit the type and size of primary container being handled and the suitable pitching and batch release of products in support of the packaging format being assembled/processed. In the present example, the track 54 and separators 56 form stators and movers of a linear motor, analogous to that of the track 18 and carriage. Using linear motors for the tracks 54 and separators 56 provides an increased level of independent control and flexibility. In other examples other arrangements for supply line pressure control and the batched release of orderly quantities of product at the required pitch and void of line pressure, into the picking area of the product handling apparatus, may be employed.

As a separator 56 approaches the belt 52, the tip of the wedge-shaped separator 56 locates between two adjacent products 22 moving alongside the track 54. As the products 22 continue to move along the belt 52 and the separators 56 continue to move around the track 54, a subsequent separator 56 locates between two later adjacent products 22. By controlling motion of the separators 56 around the tracks 54, the separators 56 act to hold back product supply line pressure, separate, and hence pitch, the products 22 into discrete groups of a chosen number of products 22. In FIG. 5, the single row of products 22 is pre-pitched into groups of three.

Once the products 22 are pre-pitched into groups or formations, they are scanned by an optical scanning device 26 for location and orientation. An optical scanning device 26 is located on either side of the belt 52. Scanning for orientation is optional, depending on whether individual product container re-orientation that they are all uniformly facing or oriented to face in given directions, is applied.

Optical scanning device 26 scans each product 22 as it passes the device 26. The optical scanning device 26 comprises an internal processor, or communicates the image data to a remote processor (e.g. located in a remote management module). This processor is configured to process the image to determine both a specific location of the product 22, for example in a two dimensional plane parallel with the belt 52, and/or an orientation of the product 22 (e.g. about the product's longitudinal axis).

The relative location (e.g. in a transverse direction across the belt 52 of the infeed transportation unit 14) is used to ensure the product is present and the picking tools 28 of the carriage 20 are correctly located when they come to engage the respective product 22. The relative orientation of the product 22 is used to determine the degree to which the picking tool 28 must rotate the product 22 during transfer to the discharge transportation unit 16 in order for the product 22 to be facing the desired way.

As described earlier, the data from the optical scanning devices 26 is processed and used by a management module to determine control instructions, which are sent to, and executed by carriages 20 to control the operation of the picking tools 28.

Figure 6:
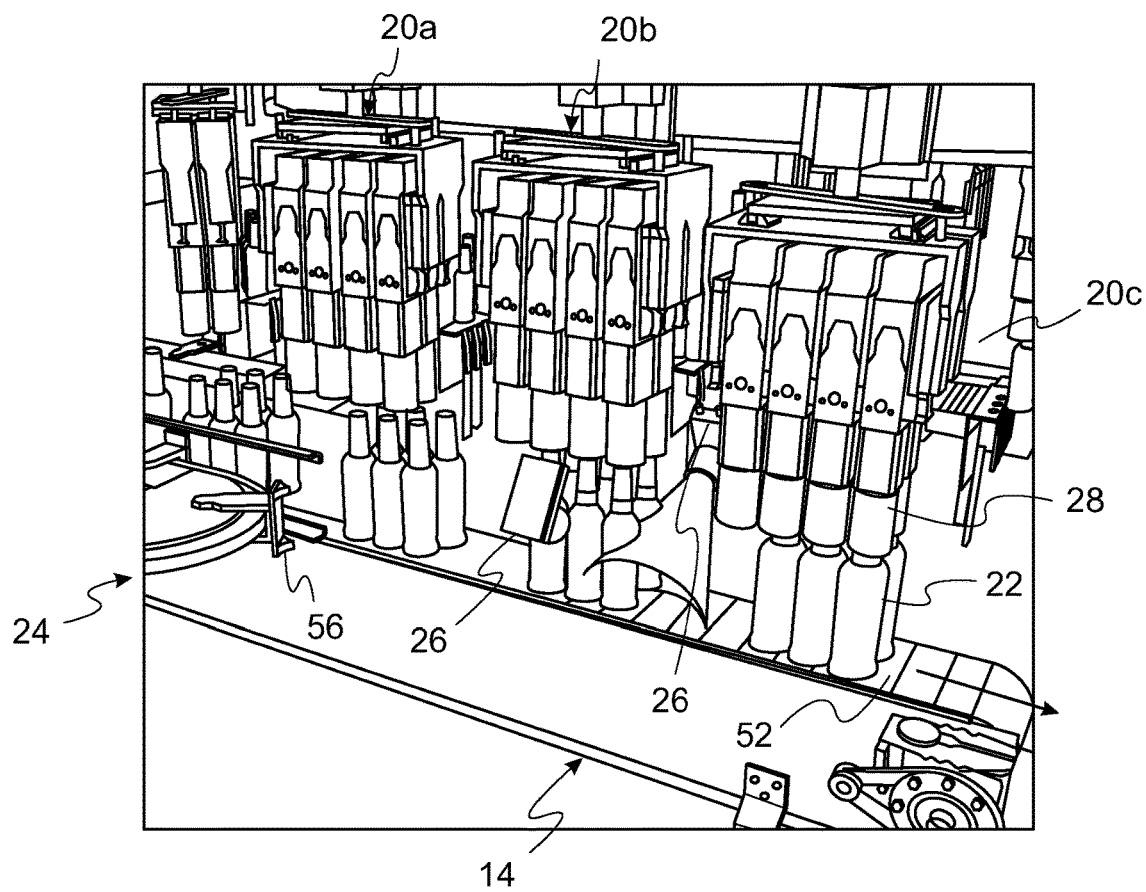
FIG. 6 depicts optical scanning at the product infeed transportation unit.

FIG. 6 shows an infeed transportation unit 14 with two rows of products 22. The products 22 are pre-pitched, as described above, into groups of three columns, so in a two by three arrangement of six products 22. The optical scanning devices 26, located on either side of the belt 52 are scanning the products 22 as they pass the devices 26 to determine the relative location and orientation of the products 22. This Figure shows three carriages, a first 20a which is in the process of aligning itself with the target products 22; a second 20b which is aligned with the products 22 but is yet to engage them; and a third 20c which is engaged with the products 22 and supporting the products 22, ready to move them to the discharge transportation unit 16.

Figure 7B:
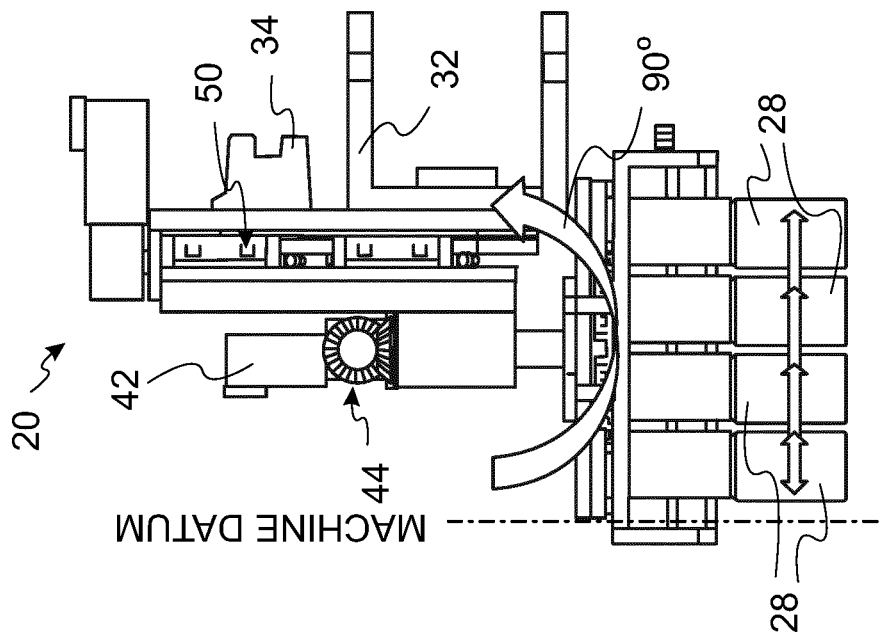
FIGS. 7A and 7B show a carriage before and after rotation of the picking tools.
Figure 7A:
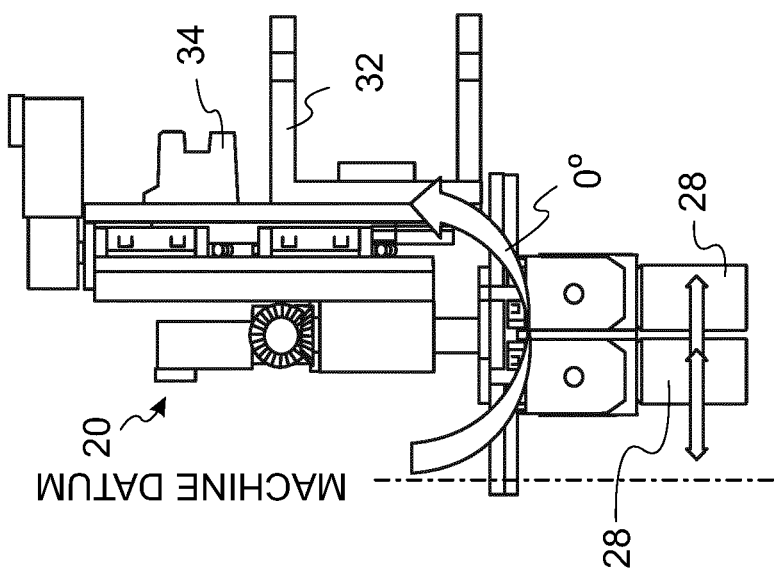

FIGS. 7A and 7B show a carriage 20 in two different arrangements. As described above, the picking tools 28 are configured to be rotated, collectively, about a common axis (e.g. a centreline of the carriage). FIGS. 7A and 7B illustrate the same carriage 20 in two different arrangements. In FIG. 7A, the picking tools 28 are arranged to pick up two rows of products (across the width of the infeed transportation unit 14, for example) and four columns of products (in a direction along the infeed transportation unit 14, for example). In the second arrangement, as shown in FIG. 7B, the picking tools 28 are arranged in four rows and two columns. The carriage 20 is configured to rotate the picking tools 28 by 90 degrees to move from the first arrangement to the second arrangement. Although products are not shown in FIGS. 7A and 7B, this rearrangement can be undertaken as the carriage moves products from the infeed length 30a to the discharge length 30b.

Figure 9:
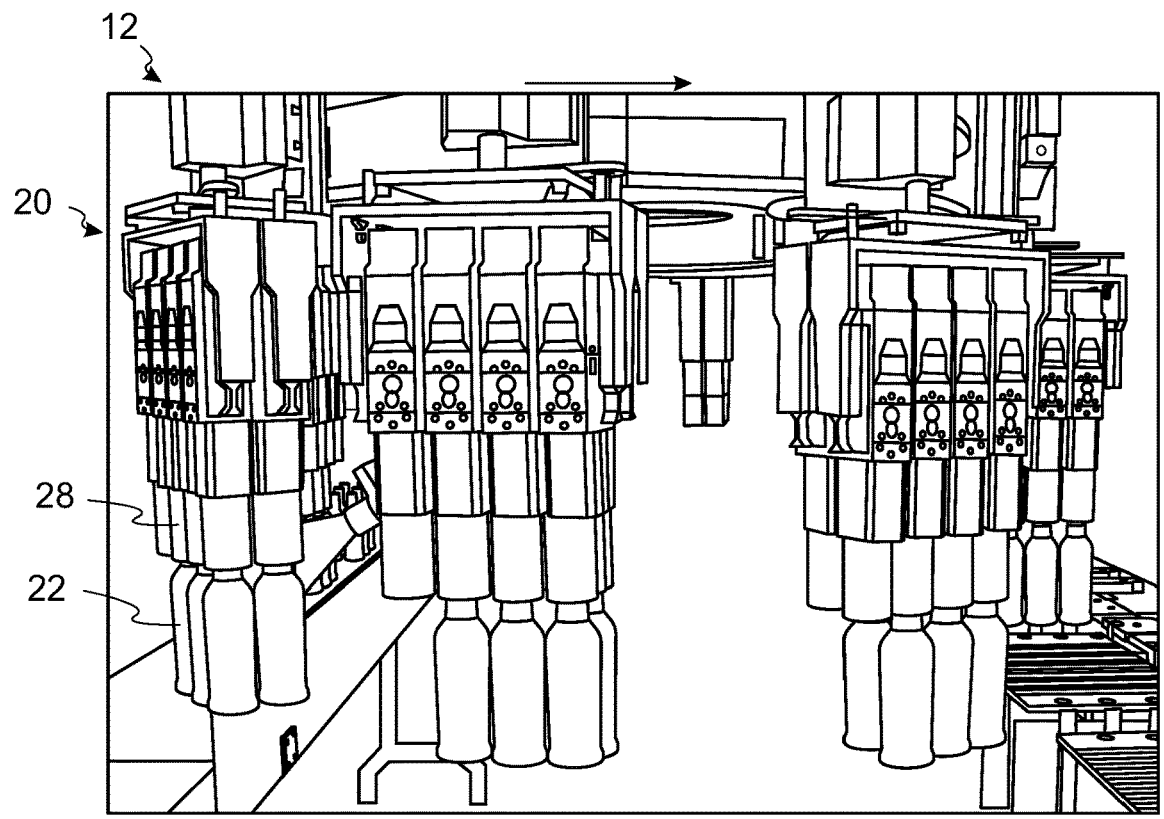
FIG. 9 is a side view of a product handling system in use.
Figure 10:
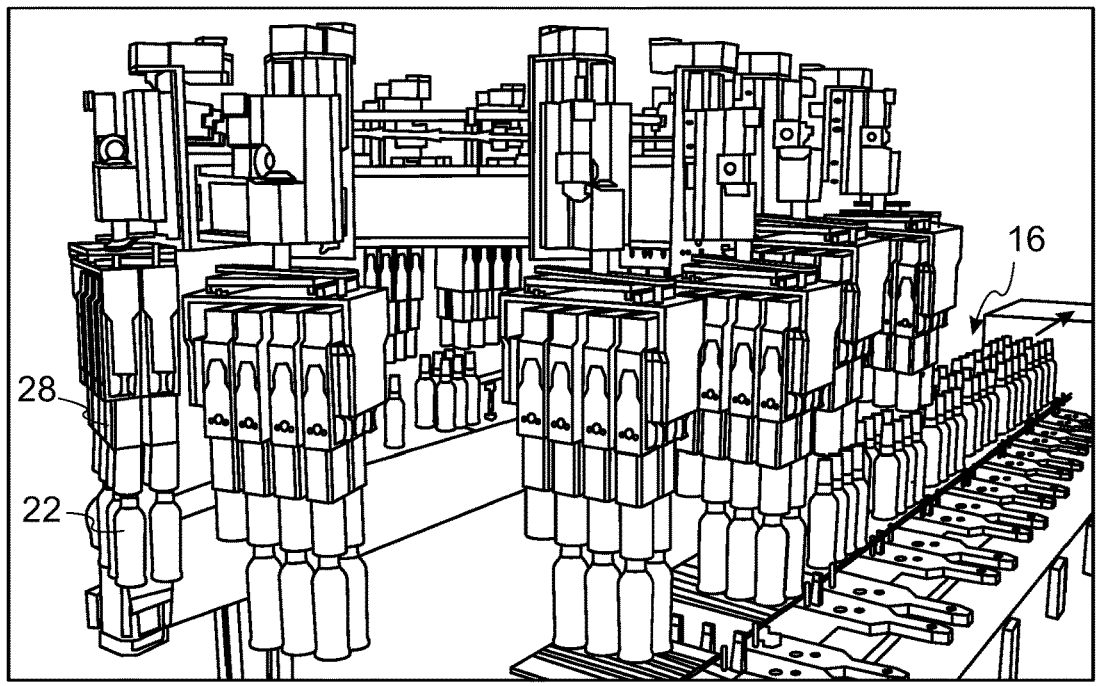
FIG. 10 is a perspective view of a product handling system in use.

FIG. 8A shows a further carriage 20 in an analogous arrangement to that of FIG. 7A. In FIG. 8A, the carriage 20 is supporting six products 22. FIG. 8B shows to carriages 20. In FIG. 8B, the picking tools 28 of each carriage 20 have been collectively rotated about a common axis by 90 degrees. FIG. 8B shows that, if these carriages 20 approach each other on the track 18, it is possible for products 22 from two different carriages 20 to be placed into a single group or arrangement at the discharge length 30b. FIGS. 9 and 10 show products 22 being moved from the infeed length 30a of the track 18 to the discharge length 30b of the track 18. As discussed previously, the product handling system 12 is configured to rearrange products 22 as they are moved from the infeed transportation unit 14 to the discharge transportation unit 16. This rearrangement may comprise any or all of: adjusting the pitch between adjacent products 22 in a row or column direction, reorienting the products 22 about their own axis, laterally moving the products 22, collectively, perpendicular to the track 18 and rotating the products 22 about a common axis. Further articulation enables the rows to be offset by half a product pitch that rows of product may be nested as opposed to being strictly aligned in rows and columns. An array of nested product patterns are possible vs the aligned product formats. Further arrangements are also possible.

In FIGS. 9 and 10, two rows and three columns of products 22 are being rotated about a common axis as they move from the input transportation unit 14 to the discharge transportation unit 16. The formation of products 22 are rotated by 90 degrees, such that the columns of products 22 at the infeed transportation unit 14 become rows of products 22 at the discharge transportation unit 16 (and vice versa). This provides great flexibility to service a wide range of discharge requirements with a more limited range of input variables.

As a rotation as shown in FIGS. 9 and 10 allows the number of columns at the input length 30a to determine the number of rows at the discharge length 30b, and the number of columns is determined by the carriage 20 dimensions and pre-pitching operation, rather than the input transportation unit belt 52 (for example), a wide range of discharge requirements can be serviced with the same apparatus. Such discharge requirements may be dictated by—for example—secondary packaging format or pattern arrangements.

In the example shown in FIGS. 9 and 10, the discharge transportation unit 16 is configured to receive three rows of products 22. The input transportation unit 14 is unable to provide three rows of products 22. However, by pre-pitching the products 22 on the input transportation unit 14 into two by three arrangements, and rotating these arrangements by 90 degrees, the products 22 can be placed at the discharge length 30b in a three by two arrangement, thus meeting the discharge requirements.

Figure 11A:
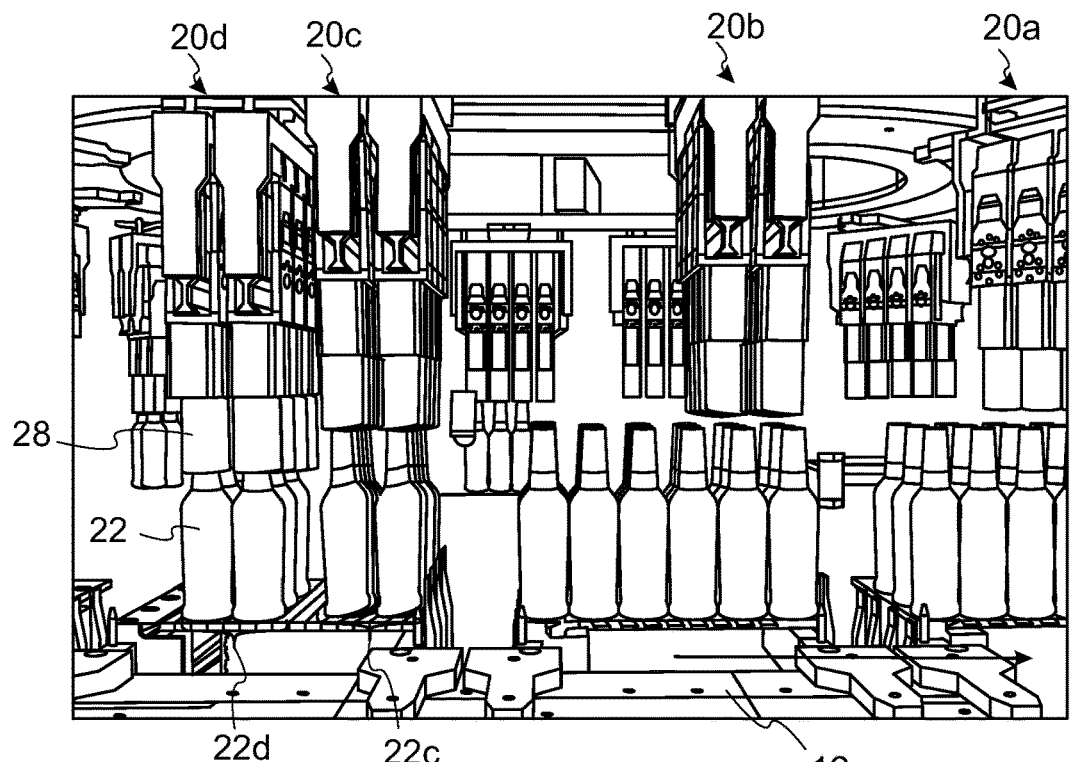
FIGS. 11A and 11B show products being placed on a discharge transportation unit.
Figure 11B:
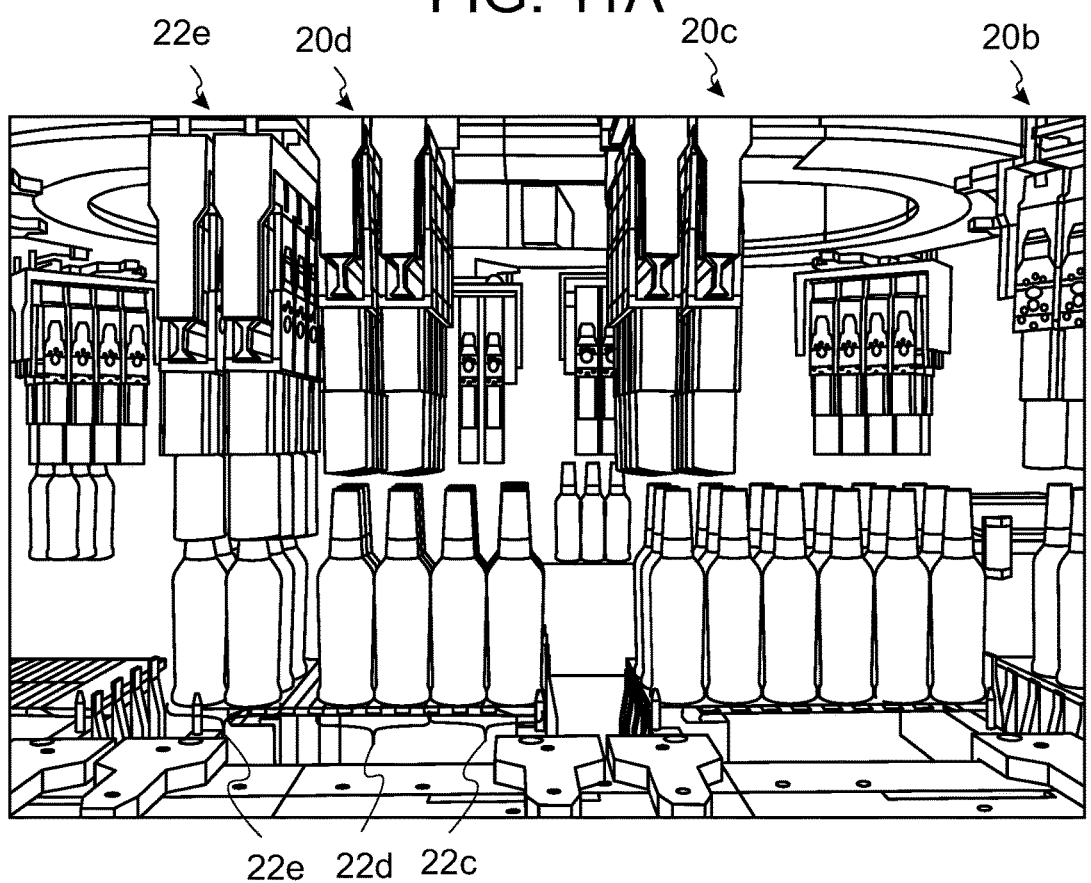

FIGS. 11A and 11B are sequential images of a product 22 placement operation on the discharge transportation unit 16. As described above, the products 22 are picked up from the input transportation unit 14 in a two by three arrangement and rearranged by the carriage 20 and picking tools 28 to a three by two arrangement as the carriage reaches the discharge length 30b. The products 22 are also repitched, to be closer together in both the row and column direction.

As the carriages 20 are moved around the track 18 using linear motors, each carriage 20 is independently controlled. As such, each carriage 20 can have a different acceleration and speed to its neighbour. This allows carriages 20 to approach each other to facilitate "double drops", in which more than one carriage 20 places products 22 on the discharge transportation unit 16 in a single group or arrangement of products 22—e.g. to fill a single secondary package.

In FIG. 11A, carriages 20a and 20b have completed their drops and are starting to move away from the placed products 22. Carriage 20c has placed its products 22c at the leading edge of a three by six secondary package on the discharge transportation unit 16. The carriage 20c has released the products 22c and the picking tools 28 are being lifted vertically away from the discharge transportation unit 16 in the manner described above.

The carriage 20d behind carriage 20c has approached the discharge length 30d and has been driven so as to approach the preceding carriage 20c. The latter carriage 20d is moving its products 22d to be immediately adjacent the products 22c of the preceding carriage 20c. The latter carriage 20d places its products 22d next to the products 22c of the preceding carriage 20c, as part of the same group, in the same secondary packaging.

In FIG. 11B, the latter carriage 20d has completed its drop, and a further carriage 20e has entered the discharge length 30b with its products 22e. In a similar manner to the latter carriage 20d of FIG. 11A, the further carriage 20e places its products 22e as part of the same group as the preceding two carriages 20c,d. The use of independently controlled carriages 20 (for example driven using linear motors) allows subsequent carriages 20 to approach preceding carriages 20 in this way. This allows an input transportation unit 14 of two rows of products 22 to serve discharge transportation unit 16 of secondary packaging with dimensions of three by six rows (for example).

Figure 12:
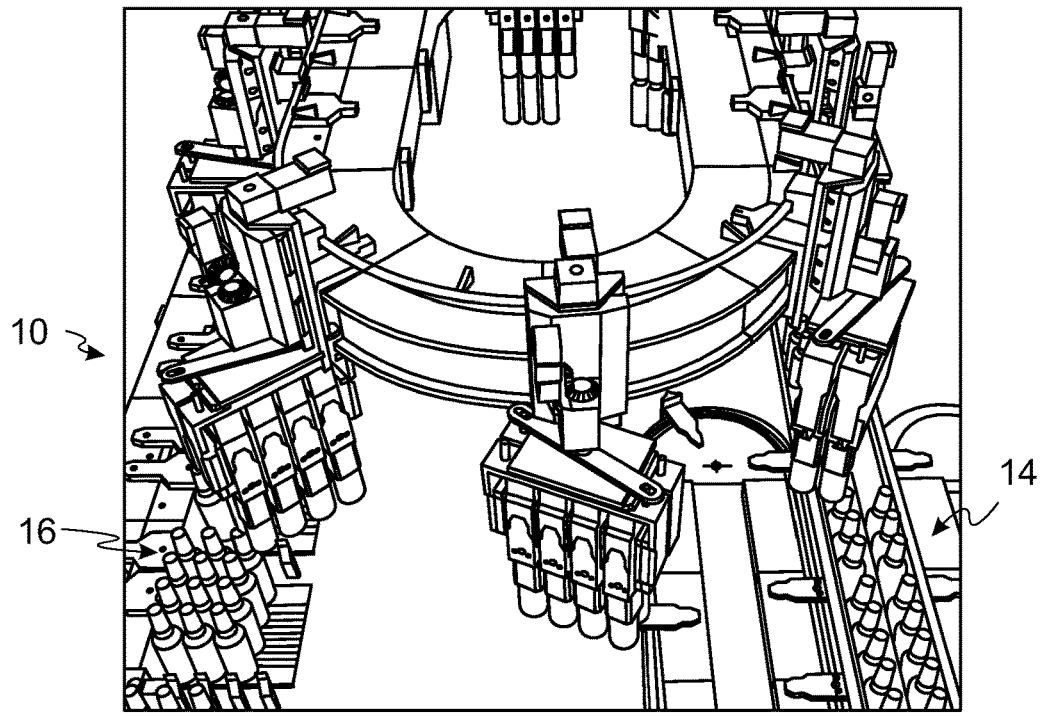
FIG. 12 is a further perspective view of a product handling system in use.

FIG. 12 shows a view of a product handling system 10 with an input transportation unit 14 conveying two rows of products and discharge transportation unit 16 discharging products 22 in a three by four format.

Figure 13:
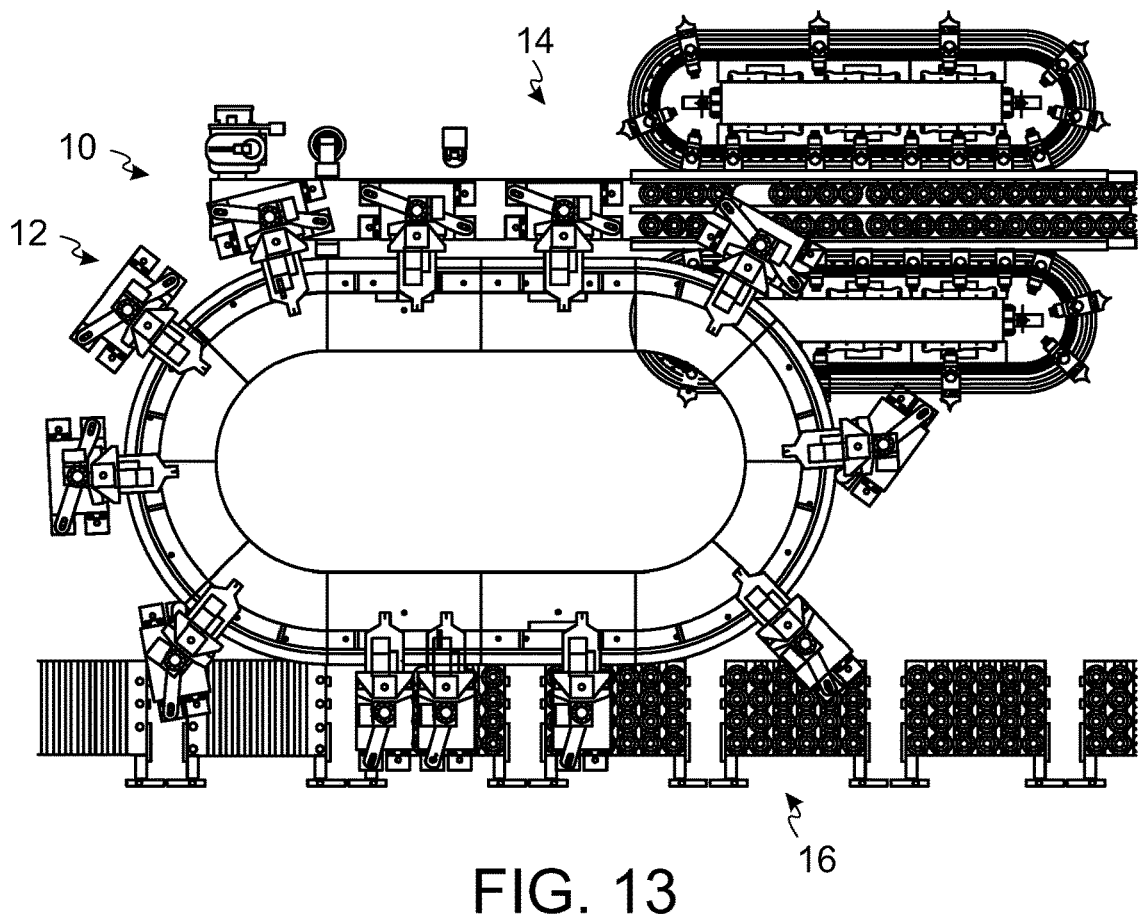
FIG. 13 is a top view of a product handling system in use.

FIG. 13 is a top view of a product handling system 10 in which products are provided to the product handling apparatus 12 in two rows; the carriages 20 pick up the products 22 in a two by four group; and the products 22 are discharge in secondary packaging in a four by six arrangement (thus requiring three carriages 20 to place products 22 in each group for secondary package). In a four by five arrangement (shorter than the four by six) the third four by two product drop is split via a double drop between the assembly of two product groups.

Figures 14, 15:
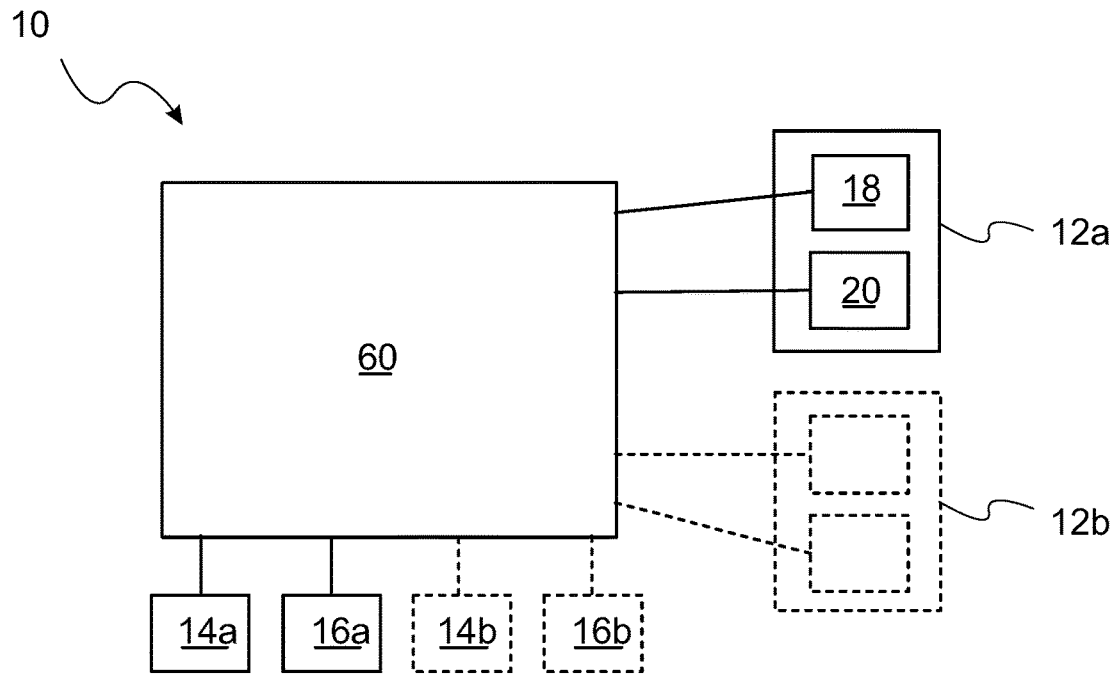
FIG. 14 depicts example infeed and discharge arrangements for a product handling system.
FIG. 15 is a schematic illustration of a product handling system.

FIG. 14 is a table showing example combinations of pick and place arrangements. The "pick" column schematically illustrates the number and arrangement of products that are picked at the infeed length. The "transfer" column schematically illustrates the arrangement of the products roughly mid-way between the infeed and discharge lengths.

The "place" column schematically illustrates the number and arrangement of the products as they are placed at the discharge length.

As the product handling system 10 is configured to operate continuously, the infeed and discharge speeds of the input and discharge transportation units must be matched to ensure a steady and constant movement of products 22. As such, the system may be configured to monitor and control the infeed and discharge speeds of the corresponding transportation units in order to ensure continuous operation.

While the above examples rotate groups of products through 90 degrees to essentially switch the rows and columns, it is to be understood that the present example is not limited to 90 degree rotations, or any specific rotation. The carriages 20 of the product handling apparatus 12 are configured to rotate the picking tools 28 and products through any angle. This opens the door to a greater variety of product arrangements and secondary packaging, arrangements with products 22 arranged other than in linear grid formations, for example. Such imaginative secondary packaging arrangements may include and not be limited to any of the nested and/or aligned packaging patterns shown in FIG. 16.

FIG. 15 schematically illustrates a product handling system 10 according to the disclosure. The product handling system 10 includes a management module 60. The management module 60 of the present example includes a processor, a data storage device and a wireless communication device.

The product handling system 10 further includes a product handling apparatus 12a including a track 18 and plurality of carriages 20. The product handling system 10 may further include additional product handling systems 12b (schematically shown in dashed lines). The product handling system 10 includes an infeed transportation unit 14a and discharge transportation unit 16a associated with the first product handling apparatus 12a. The product handling system may comprise further infeed and outfeed transportation units 14b, 16b, which may be associated with a single, or multiple product handling apparatuses The management module 60 is configured to control and synchronize product handling operations of the product handling apparatus(es) 10. The management module 60 is configured to receive data from the product handling system 10, process the data and generate control instructions. These control instructions, when executed by the product handling apparatus(es) 12, control the operation of the product handling apparatus(es) 12.

The management module 60 of the present example comprises a wireless communication device and/or a wired communication device/bus, for receiving data from the product handling apparatus 12 and transmitting control instructions to the product handling apparatus 12. The management module 60 comprises a data storage device to store, and a processor to process data received from the product handling apparatus 12 and generate control instructions.

The management module 60 is configured to receive data from the infeed transportation unit 14a. For example, the management module 60 receives data relating to the speed of the input transportation unit belt 52. The management module 60 receives data from the pre-pitching device 24 relating to the operation of this device—e.g. relating to the location and movement of the separators 56 around the pre-pitching track 54. The management module 60 receives data from the optical scanning device(s) 26 relating to the location and orientation of products 22 on the infeed transportation unit belt 52. This data may be communicated using wires or wirelessly. The infeed transportation unit 14a comprises a plurality of sensors, configured to monitor this data for transmission to the management module 60.

The management module 60 is configured to receive data from the discharge transportation unit 16a. For example, the management module 60 receives data relating to the discharge pitch, pace and position of the discharge transportation unit specific to each packaging group being assembled or positioned thereof. The management module 60 may receive data from the discharge transportation unit relating to the required arrangement of products 22 arriving at the discharge length 30b of the track 18. This may be dictated, for example, by the combination of primary product type and size and the secondary packaging format being produced. This data may be communicated using wires or wirelessly. The discharge transportation unit 16a comprises a plurality of sensors, configured to monitor the operation and provide the data for transmission to the management module 60.

In some examples, the management module 60 may receive data from the track of the product handling apparatus 12a. For example, the management module 60 may receive data relating to the location and movement of the carriages 20 from the track 18. This data may be communicated using wires or wirelessly. The track 18 comprises a plurality of sensors, configured to monitor this operation and provide the data for transmission to the management module 60.

The management module 60 is further configured to receive data from the carriages 20. The management module 60 may receive data relating to the location and movement of the carriages 20 on the track 18a from the carriages 20. The management module 60 receives data relating to the arrangement of the corresponding picking tools 28 (and hence any products 22 supported therein) from the carriages 20. The management module 60 receives data relating to any or all of: the rotation of the picking tools 28, the pitch of the picking tools 28 in either or both of a column and row direction, the orientation of the picking tools 28, the lateral position of the picking tools 28 in a direction perpendicular to the track 18 and the vertical position of the picking tools 28.

As discussed above, the carriages 20 of the disclosure are untethered from the track 18. That is, there is no permanent wired connection between the carriages 20 and the track 18. As such, as discussed above, the carriages 20 comprise a wireless communication device for communicating wirelessly with any or both of the track and the management module 60. As such, the above data is transmitted wirelessly by the carriages 20. This data may therefore be received wirelessly by the management module 60. Alternatively, the data wirelessly transmitted by the carriages 20 may be received by a local wireless master serving the carriage mounted wireless clients traversing about the track 18 (or a wireless communication device thereof) and communicated to the management module 60 using wired communication.

The management module 60 is configured to receive data, process the data and generate control instructions or actuation signals. The control instructions are configured to control the operation of the product handling apparatus 12. Actuation signals may be configured to directly actuation devices of the product handling apparatus 12. Actuation signals may be communicated for direct control of actuation devices (e.g. tulips, grippers, linear movers) without the need for a processor or control module to execute control instructions.

The management module 60 may generate and communicate control instructions or actuation signals for any or all of the infeed transportation unit 14a, the discharge transportation unit 16a, the track 18 and the carriages 20. Each of the infeed transportation unit 14a, discharge transportation unit 16a, track 18 and carriages 20 may comprise a wired or wireless communication device configured to receive the control instructions and a processor configured to execute the control instructions.

The control instructions may comprise instructions relating to any or all of the following:
- operation of the infeed transportation unit belt 52, for example movement speed to ensure continuous operation of the product handling system 10;
- operation of the discharge transportation unit belt, for example the movement speed to ensure continuous operation of the product handling system 10;
- operation of the pre-pitching device 24, for example to determine the formation of products at the infeed length 30a;
- synchronized movement of the carriage(s) 20 around the track 18, for example to facilitate picking up of products 22 at the infeed length 30a, moving the products to the discharge length 30b, and placing the products in the correct arrangement and correctly grouped at the discharge length 30b;
- the arrangement and position of picking tools 28 at the input length 30a to facilitate engagement with the products 22;
- vertical movement of the picking tools 28 to enable engagement of the picking tools 28 with the products 22, and movement of the products 22 and picking tools 28 around the track 18 without collision;
- the operation of the picking tools 28 (i.e. to engage and release products 22—for example by activating and deactivating pneumatics);
- any required change in the arrangement of the picking tools 28 (and any products 22 supported therein) by rotation of the formation of picking tools 28 about a common axis;
- any required change in the arrangement of the picking tools 28 (and any products 22 supported therein) by reorienting one, some, or each of the picking tools 28 about its axis;
- any required change in the arrangement of the picking tools 28 (and any products 22 supported therein) by adjusting the pitch of the products in either or both of a row and column direction and
- any required change in the arrangement of the picking tools 28 (and any products 22 supported therein) by moving the picking tools 28 collectively in a direction perpendicular to the track 18.

Figure 16:
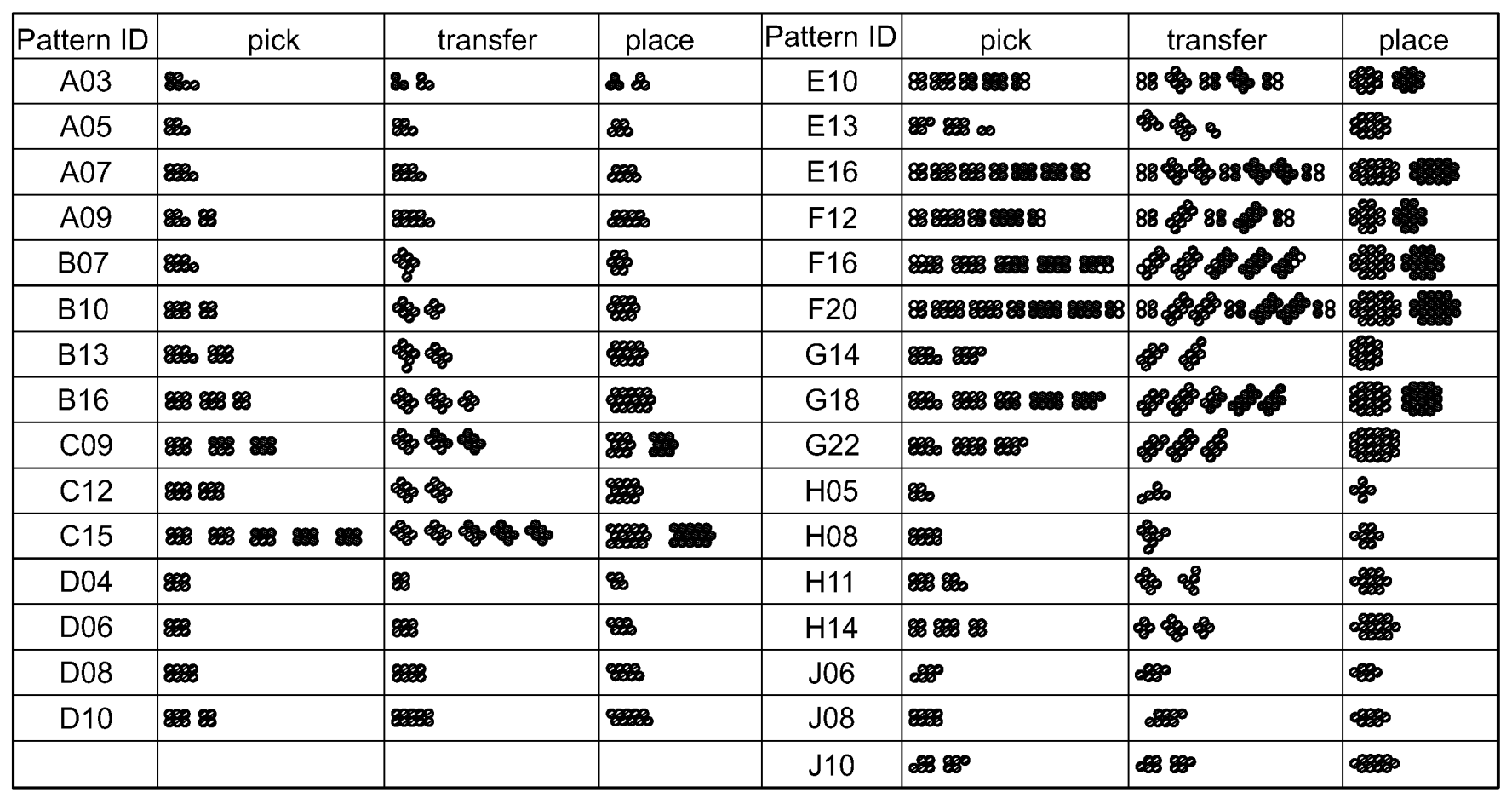

FIG. 16 is a further table showing example combinations of pick and place arrangements. Some of the examples of FIG. 16 illustrate 'nested' combinations (see Pattern IDs starting with Axx, Bxx, Cxx, Dxx and Jxx). Such nested arrangements (in which neighbouring rows are offset) can be achieved by shifting a first row parallel to the direction of carriage movement relative to a second row and then reducing the distance between the rows in a transverse direction.

The examples of Pattern IDs Exx and Gxx involve multiple carriages placing products in a single output/discharge arrangement, as well as single carriages placing products in two separate product arrangements.

The present invention has been described above purely by way of example. Modifications in detail may be made to the present invention within the scope of the claims as appended hereto. Furthermore, features from one example may be combined with an alternative example unless such a combination is explicitly precluded.

The invention claimed is:

1. A product handling apparatus, comprising:
    a continuous circuit comprising:
        an infeed length; and
        a discharge length;
    a carriage configured to travel around the circuit between the infeed length and the discharge length; the carriage comprising:
        a first picking tool configured to selectively engage a first product; and
        a second picking tool configured to selectively engage a second product;
    wherein the product handling apparatus is configured to pick a first and second product arranged in a first arrangement at the infeed length and place the first and second product in a second arrangement, different to the first arrangement, at the discharge length; and
    wherein the carriage is configured to arrange the first and second picking tools in the first arrangement at the infeed length and move the first and second picking tools to the second arrangement as the carriage moves to the discharge length; and the first and second picking tools are configured to move towards or away from each other, perpendicular to the circuit at the point on which the carriage is located, for changing the pitch of the first and second picking tools or products supported therein.

2. The product handling apparatus of claim 1, wherein the carriage comprises a plurality of picking tools, provided in at least one row.

3. The product handling apparatus of claim 1, wherein the first and second picking tools are rearrangeable for picking products in a plurality of different arrangements at the infeed length.

4. The product handling apparatus of claim 1, wherein each of the first and second arrangements is defined by:
    a position of the second product relative to the first product;
    a position of the first and second product perpendicular to the circuit;
    a pitch of the first and second products; and
    an orientation of each of the first and second products; and
    wherein at least one of the relative position, perpendicular position, pitch and an orientation of the second arrangement is different to that of the first arrangement.

5. The product handling apparatus of claim 1, wherein the carriage is configured to arrange the first and second picking tools in the first arrangement at the infeed length and move the first and second picking tools to the second arrangement as the carriage moves to the discharge length; and the carriage is configured to rotate the first and second picking tools about a common vertical axis for changing the relative position of the first and second picking tools or products supported therein.

6. The product handling apparatus of claim 1, wherein the carriage is configured to arrange the first and second picking tools in the first arrangement at the infeed length and move the first and second picking tools to the second arrangement as the carriage moves to the discharge length; and the carriage is configured to translate the first and/or the second picking tools perpendicular and/or parallel to the circuit at the point on which the carriage is located.

7. The product handling apparatus of claim 1, wherein the carriage is configured to move the first and second picking tools vertically.

8. The product handling apparatus of claim 1, wherein the carriage is a first carriage and the product handling apparatus further comprises a second carriage configured to travel around the circuit between the infeed length and the discharge length; the second carriage comprising:
a first picking tool configured to selectively engage a product; and
a second picking tool configured to selectively engage a product;
wherein the second carriage is configured to travel around the circuit independently to the first carriage, such that the product handling apparatus is configured to vary a spacing between the first carriage and second carriage.

9. The product handling apparatus of claim 8, wherein the first carriage is configured to pick a first and second product at the infeed length; the second carriage is configured to pick a third and fourth product at the infeed length; and the first and second carriages are configured to place the first, second, third and fourth product in a single arrangement at the discharge length.

10. A product handling system comprising the product handling apparatus of claim 1.

11. The product handling system of claim 10, further comprising:
an infeed transportation unit for feeding products to the product handling apparatus at the infeed length; and
a discharge transportation unit at the discharge length, for transferring products away from the discharge length of the product handling apparatus;
wherein the infeed length of the circuit corresponds to the infeed transportation unit and the discharge length of the circuit corresponds to the discharge transportation unit.

12. The product handling system of claim 11, further comprising:
a management module configured to control the product handling apparatus, the infeed transportation unit and/or the discharge transportation unit; the management module comprising:
a communication device configured to receive operational data from the product handling apparatus, the infeed transportation unit and/or the discharge transportation unit; and transmit control instructions or actuation signals to the product handling apparatus, the infeed transportation unit and/or the discharge transportation unit;
a processor configured to process the operational data received from the product handling apparatus and generate the control instructions or actuation signals for the product handling apparatus.

13. A method for handling products, the method comprising:
moving a carriage comprising a first and second picking tool to an infeed length of a continuous circuit;
picking a first and second product arranged in a first arrangement at the infeed length;
moving the first and second product around part of the continuous circuit from the infeed length to a discharge length of the circuit; and
placing the first and second product in a second arrangement, different to the first arrangement, at the discharge length;
wherein the carriage is configured to arrange the first and second picking tools in the first arrangement at the infeed length and move the first and second picking tools to the second arrangement as the carriage moves to the discharge length; and the first and second picking tools are configured to move towards or away from each other, perpendicular to the circuit at the point on which the carriage is located, for changing the pitch of the first and second picking tools or products supported therein.

14. A product handling system comprising:
a product handling apparatus comprising:
a carriage comprising
a first picking tool configured to selectively engage a first product; and
a second picking tool configured to selectively engage a second product;
wherein the product handling apparatus is configured to pick a first and second product at a first location and place the first and second product at a second location;
the product handling apparatus further comprising: a communication device configured to receive control instructions or actuation signals to control the carriage such that it can pick and place the first and second product;
the product handling system further comprising: a management module configured to control the product handling apparatus; the management module comprising:
a communication device configured to receive operational data from the product handling apparatus and transmit control instructions or actuation signals to the product handling apparatus;
a processor configured to process the operational data received from the product handling apparatus and generate the control instructions or actuation signals for the product handling apparatus.

15. A carriage for use in a product handling apparatus; the carriage comprising:
a first picking tool configured to selectively engage a first product; and
a second picking tool configured to selectively engage a second product;
wherein the carriage is configured to pick a first and second product arranged in a first arrangement and place the first and second product in a second arrangement, different to the first arrangement;
wherein the carriage is configured to arrange the first and second picking tools in the first arrangement at the infeed length and move the first and second picking tools to the second arrangement as the carriage moves to the discharge length; and the first and second picking tools are configured to move towards or away from each other, perpendicular to the circuit at the point on which the carriage is located, for changing the pitch of the first and second picking tools or products supported therein.

\* \* \* \* \*